US011004230B2

(12) United States Patent
Pollefeys et al.

(10) Patent No.: US 11,004,230 B2
(45) Date of Patent: May 11, 2021

(54) PREDICTING THREE-DIMENSIONAL ARTICULATED AND TARGET OBJECT POSE

(71) Applicant: Microsoft Technology Licensing, LLC, Redmond, WA (US)

(72) Inventors: Marc Andre Leon Pollefeys, Zurich (CH); Bugra Tekin, Zurich (CH); Federica Bogo, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 122 days.

(21) Appl. No.: 16/362,552

(22) Filed: Mar. 22, 2019

(65) Prior Publication Data

US 2020/0302634 A1 Sep. 24, 2020

(51) Int. Cl.
*G06T 7/70* (2017.01)

(52) U.S. Cl.
CPC ............ *G06T 7/70* (2017.01); *G06T 2200/04* (2013.01); *G06T 2207/20084* (2013.01)

(58) Field of Classification Search
CPC .................. G06T 7/70; G06T 2200/04; G06T 2207/20084
See application file for complete search history.

(56) References Cited

U.S. PATENT DOCUMENTS

| 6,256,418 | B1 | 7/2001 | Rehg et al. |
| 2013/0142390 | A1 | 6/2013 | Othmezouri et al. |
| 2013/0271458 | A1 | 10/2013 | Andriluka et al. |
| 2017/0316578 | A1* | 11/2017 | Fua .......................... G06T 7/246 |
| 2018/0137644 | A1 | 5/2018 | Rad et al. |
| 2019/0294881 | A1* | 9/2019 | Polak .................... G06K 9/4628 |
| 2020/0117959 | A1* | 4/2020 | Sargent .................. G06K 9/685 |

FOREIGN PATENT DOCUMENTS

| WO | 2017115149 A1 | 7/2017 |
| WO | WO2020099338 | * 11/2018 |

OTHER PUBLICATIONS

Combined discriminative and generative articulated pose and non-rigid shape estimation (Year: 2007).*

(Continued)

*Primary Examiner* — Nizar N Sivji
(74) *Attorney, Agent, or Firm* — Alleman Hall Creasman & Tuttle LLP

(57) ABSTRACT

A data processing system is provided that includes a processor having associated memory, the processor being configured to execute instructions using portions of the memory to cause the processor to, at classification time, receive an input image frame from an image source. The input image frame includes an articulated object and a target object. The processor is further caused to process the input image frame using a trained neural network configured to, for each input cell of a plurality of input cells in the input image frame predict a three-dimensional articulated object pose of the articulated object and a three-dimensional target object pose of the target object relative to the input cell. The processor is further caused to output the three-dimensional articulated object pose and the three-dimensional target object pose from the neural network.

20 Claims, 9 Drawing Sheets

(56) References Cited

OTHER PUBLICATIONS

Keep it SMPL: Automatic Estimation of 3D Human Pose and Shape from a Single Image (Year: 2016).*
Computer Vision ECCV 2016—14th European Conference Amsterdam, The Netherlands (Year: 2016).*
HoloPose: Holistic 3D Human Reconstruction In-The-Wild (Year: 2019).*
Articulated Multi-body Tracking Under Egomotion (Year: 2008).*
Goudie, Duncan, "Discriminative Hand-Object Pose Estimation from Depth Images Using Convolutional Neural Networks", In Thesis Submitted for the Degree of Doctor of Philosophy, In the Faculty of Science and Engineering, School of Computer Science, Jan. 1, 2018, pp. 1-113.
Kokic et al., "Learning to Estimate Pose and Shape of Hand-Held Objects from RGB Images", In Repository of arXiv:1903.03340, Mar. 8, 2019, 8 Pages.
Neher et al., "HyperStackNet: A Hyper Stacked Hourglass Deep Convolutional Neural Network Architecture for Joint Player and Stick Pose Estimation in Hockey", In Proceedings of the 15th Conference on Computer and Robot Vision, May 8, 2018, pp. 313-320.
"International Search Report and Written Opinion Issued in PCT Application No. PCT/US20/017399", dated May 6, 2020, 15 Pages.
Tekin et al., "H+O: Unified Egocentric Recognition of 3D Hand-Object Poses and Interactions", In Repository of arXiv:1904.05349, Apr. 10, 2019, 13 Pages.
Baradel, et al., "Object Level Visual Reasoning in Videos", In Proceedings of 15th European Conference on Computer Vision, Sep. 8, 2018, 19 Pages.
Bertasius, et al., "First-Person Action-Object Detection with EgoNet", In Proceedings of Robotics: Science and System, Jul. 12, 2017, 10 Pages.
Bobick, et al., "The Recognition of Human Movement Using Temporal Templates", In Journal of IEEE Transactions on Pattern Analysis and Machine Intelligence, vol. 23, Issue 3, Mar. 2001, pp. 928-934.
Eirachmann, et al., "Uncertainty-Driven 6D Pose Estimation of Objects and Scenes from a Single RGB Image", In Proceedings of IEEE Conference on Computer Vision and Pattern Recognition, Jun. 27, 2016, pp. 3364-3372.
Cai, et al., "Understanding Hand-Object Manipulation with Grasp Types and Object Attributes", In Proceedings of Robotics: Science and System, Jun. 18, 2016, 10 Pages.
Chapelle, et al., "Gradient Descent Optimization of Smoothed Information Retrieval Metrics", In Journal of Information Retrieval, vol. 13, Issue 3, Jun. 2010, 21 Pages.
Cho, et al., "Learning Phrase Representations using RNN Encoder—Decoder for Statistical Machine Translation", In Proceedings of the Conference on Empirical Methods in Natural Language Processing, Oct. 25, 2014, pp. 1724-1734.
Choi, et al., "Robust Hand Pose Estimation during the Interaction with an Unknown Object", In Proceedings of the IEEE Conference on Computer Vision and Pattern Recognition, Oct. 1, 2017, pp. 3123-3132.
Choutas, et al., "PoTion: Pose MoTion Representation for Action Recognition", In Proceedings of IEEE Conference on Computer Vision and Pattern Recognition, Jun. 18, 2018, pp. 7024-7033.
Damen, et al., "Scaling Egocentric Vision: The EPIC-KITCHENS Dataset", In Proceedings of European Conference on Computer Vision, Sep. 8, 2018, 19 Pages.
Dollar, et al., "Behavior Recognition via Sparse Spatio-Temporal Features", In Proceedings of 2nd Joint IEEE International Workshop on Visual Surveillance and Performance Evaluation of Tracking and Surveillance, Oct. 15, 2005, 8 Pages.
Dwibedi, Debidatta, "Towards Pose Estimation of 3D Objects in Monocular Images via Keypoint Detection", Retrieved From https://debidatta.github.io/assets/16811_project.pdf, Dec. 26, 2018, 5 Pages.

Everingham, et al., "The PASCAL Visual Object Classes (VOC) Challenge", In International Journal of Computer Vision, vol. 88, Issue 2, Jun. 2010, pp. 303-338.
Fathi, et al., "Learning to Recognize Daily Actions Using Gaze", In Proceedings of 12th European Conference on Computer Vision, Oct. 7, 2012, 14 Pages.
Fathi, et al., "Learning to Recognize Objects in Egocentric Activities", In Proceedings of 24th IEEE Conference on Computer Vision and Pattern Recognition, Oct. 7, 2012, pp. 3281-3288.
Fathi, et al., "Understanding Egocentric Activities", In Proceedings of IEEE International Conference on Computer Vision, Nov. 6, 2011, 8 Pages.
Feichtenhofer, et al., "Convolutional Two-stream Network Fusion for Video Action Recognition", In Proceedings of IEEE Conference on Computer Vision and Pattern Recognition, Jun. 27, 2016, pp. 1933-1941.
Fouhey, et al., "From Lifestyle VLOGs to Everyday Interaction", In Proceedings of IEEE/CVF Conference on Computer Vision and Pattern Recognition, Jun. 18, 2018, 11 Pages.
Gkioxari, et al., "Detecting and Recognizing Human-Object Interactions", In Proceedings of IEEE/CVF Conference on Computer Vision and Pattern Recognition, Jun. 18, 2018, pp. 8359-8367.
Goudie, et al., "3D Hand-Object Pose Estimation from Depth with Convolutional Neural Networks", In Proceedings of 12th IEEE International Conference on Automatic Face and Gesture Recognition, May 30, 2017, 8 Pages.
Gower, J. C., "Generalized Procrustes Analysis", In Journal of Psychometrika, vol. 40, Issue 1, Mar. 1975, pp. 33-51.
Goyal, et al., "The "Something Something" Video Database for Learning and Evaluating Visual Common Sense", In Proceedings of IEEE International Conference on Computer Vision, vol. 1, Issue 2, Oct. 22, 2017, pp. 5842-5850.
Hamer, et al., "Tracking a Hand Manipulating an Object", In Proceedings of IEEE 12th International Conference on Computer Vision, Sep. 29, 2009, 8 Pages.
Garcia-Hernando, et al., "First-Person Hand Action Benchmark with RGB-D Videos and 3D Hand Pose Annotations", In Proceedings of IEEE/CVF Conference on Computer Vision and Pattern Recognition, Jun. 18, 2018, pp. 409-419.
Hochreiter, et al., "Long Short-Term Memory", In Journal of Neural Computation, vol. 9, Issue 8, Nov. 15, 1997, 32 Pages.
Hu, et al., "Jointly Learning Heterogeneous Features for RGB-D Activity Recognition", In Proceedings of the IEEE Conference on Computer Vision and Pattern Recognition, Jun. 7, 2015, pp. 5344-5352.
Iqbal, et al., "Hand Pose Estimation via Latent 25D Heatmap Regression", In Proceedings of 15th European Conference on Computer Vision, Sep. 8, 2018, 17 Pages.
Jhuang, et al., "A Biologically Inspired System for Action Recognition", In Proceedings of IEEE 11th International Conference on Computer Vision, Oct. 14, 2007, 8 Pages.
Kalogeiton, et al., "Joint Learning of Object and Action Detectors", In Proceedings of IEEE International Conference on Computer Vision, Oct. 22, 2017, pp. 4163-4172.
Kehl, et al., "SSD-6D: Making RGB-based 3D Detection and 6D Pose Estimation Great Again", In Proceedings of IEEE International Conference on Computer Vision, Oct. 22, 2017, pp. 1521-1529.
Kitani, et al., "Fast Unsupervised Ego-action Learning for First-person Sports Videos", In Proceedings of the IEEE Conference on Computer Vision and Pattern Recognition, Jun. 20, 2011, pp. 3241-3248.
Koppula, et al., "Learning Human Activities and Object Affordances from RGB-D Videos", In International Journal of Robotics Research, vol. 32, Issue 8, Jul. 11, 2013, pp. 951-970.
Laptev, et al , "Space-time Interest Points", In Proceedings of the Ninth IEEE International Conference on Computer Vision, vol. 2, Oct. 13, 2003, 8 Pages.
Lepetit, et al., "EPnP: An Accurate O(n) Solution to the PnP Problem", In International Journal of Computer Vision, vol. 81, Issue 2, Feb. 2009, 13 Pages.
Li, et al., "Delving into Egocentric Actions", In Proceedings of IEEE Conference on Computer Vision and Pattern Recognition, Jun. 7, 2015, pp. 287-295.

(56) References Cited

OTHER PUBLICATIONS

Ma, et al., "Going Deeper into First-Person Activity Recognition", In Proceedings of IEEE Conference on Computer Vision and Pattern Recognition, Jun. 27, 2016, pp. 1894-1903.
Mueller, et al., "GANerated Hands for Real-Time 3D Hand Tracking from Monocular RGB", In Proceedings of IEEE Conference on Computer Vision and Pattern Recognition, Jun. 18, 2018, 11 Pages.
Mueller, et al., "Real-time Hand Tracking under Occlusion from an Egocentric RGB-D Sensor", In Proceedings of IEEE International Conference on Computer Vision, Oct. 22, 2017, pp. 1284-1293.
Niebles, et al., "Unsupervised Learning of Human Action Categories using Spatio-Temporal Words", In Proceedings of the British Machine Vision Conference, Sep. 4, 2006, 10 Pages.
Oberweger, et al., "Efficiently Creating 3D Training Data for Fine Hand Pose Estimation", In Proceedings of IEEE Conference on Computer Vision and Pattern Recognition, Jun. 27, 2016, pp. 4957-4965.
Oberweger, et al., "Training a Feedback Loop for Hand Pose Estimation", In Proceedings of International Conference on Computer Vision, Dec. 7, 2015, pp. 3316-3324.
Oikonomidis, et al., "Full DOF Tracking of a Hand Interacting with an Object by Modeling Occlusions and Physical Constraints", In Proceedings of the IEEE International Conference on Computer Vision, Nov. 6, 2011, pp. 2088-2095.
Oreifej, et al., "HON4D: Histogram of Oriented 4D Normals for Activity Recognition from Depth Sequences", In Proceedings of IEEE Conference on Computer Vision and Pattern Recognition, Jun. 23, 2013, pp. 716-723.
Panteleris, et al., "3D Tracking of Human Hands in Interaction with Unknown Objects", In Proceedings of the British Machine Vision Conference, Sep. 7, 2015, 12 Pages.
Panteleris, et al., "Using a Single RGB Frame for Real Time 3D Hand Pose Estimation in the Wild", In Proceedings of IEEE Winter Conference on Applications of Computer Vision, Mar. 12, 2018, 10 Pages.
Pirsiavash, et al., "Detecting Activities of Daily Living in First-Person Camera Views", In Proceedings of IEEE Conference on Computer Vision and Pattern, Jun. 16, 2012, 38 Pages.
Poleg, et al., "Compact CNN for Indexing Egocentric Videos", In Proceedings of IEEE Winter Conference on Applications of Computer, Mar. 7, 2016, 9 Pages.
Rad, et al., "BB8: A Scalable, Accurate, Robust to Partial Occlusion Method for Predicting the 3D Poses of Challenging Objects without Using Depth", In Proceedings of IEEE International Conference on Computer Vision, Oct. 22, 2017, 9 Pages.
Rahmani, et al., "3D Action Recognition from Novel Viewpoints", In Proceedings of IEEE Conference on Computer Vision and Pattern Recognition, Jun. 27, 2016, pp. 1506-1515.
Redmon, et al., "YOLO9000: Better, Faster, Stronger", In Proceedings of the IEEE Conference on Computer Vision and Pattern Recognition, Jul. 21, 2017, 9 Pages.
Ren, et al., "Figure-ground Segmentation Improves Handled Object Recognition in Egocentric Video", In Proceedings of IEEE Computer Society Conference on Computer Vision and Pattern Recognition, Jun. 13, 2010, 8 Pages.
Rogez, et al., "First-Person Pose Recognition Using Egocentric Workspaces", In Proceedings of IEEE Conference on Computer Vision and Pattern Recognition, Jun. 7, 2015, pp. 4325-4333.
Rogez, et al., "Understanding Everyday Hands in Action from RGB-D Images", In Proceedings of IEEE International Conference on Computer Vision, Dec. 7, 2015, pp. 3889-3897.
Romero, et al., "Non-Parametric Hand Pose Estimation with Object Context", In Journal of Image and Vision computing, vol. 31, Issue 8, Aug. 2013, pp. 555-564.
Ryoo, et al., "First-Person Activity Recognition: What Are They Doing to Me?", In Proceedings of IEEE Conference on Computer Vision and Pattern Recognition, Jun. 23, 2013, pp. 2730-2737.
Ryoo, et al., "Pooled Motion Features for First-Person Videos", In Proceedings of IEEE Conference on Computer Vision and Pattern Recognition, Jun. 7, 2015, pp. 896-904.
Santoro, et al., "A Simple Neural Network Model for Relational Reasoning", In Proceedings of Advances in Neural Information Processing Systems, Dec. 7, 2017, 10 Pages.
Sigurdsson, et al., "Actor and Observer: Joint Modeling of First and Third-Person Videos", In Proceedings of IEEE Conference on Computer Vision and Pattern Recognition, Jun. 18, 2018, 12 Pages.
Spurr, et al., "Cross-modal Deep Variational Hand Pose Estimation", In Proceedings of IEEE Conference on Computer Vision and Pattern Recognition, Jun. 18, 2018, 10 Pages.
Sridhar, et al., "Fast and Robust Hand Tracking Using Detection-Guided Optimization", In Proceedings of Computer Vision and Pattern Recognition, Jun. 7, 2015, 9 Pages.
Sridhar, et al., "Real-time Joint Tracking of a Hand Manipulating an Object from RGB-D Input", In Proceedings of 14th European Conference on Computer Vision, Oct. 11, 2016, 17 Pages.
Sundaram, et al., "High Level Activity Recognition using Low Resolution Wearable Vision", In Proceedings of IEEE Computer Society Conference on Computer Vision and Pattern Recognition Workshops, Jun. 20, 2009, 15 Pages.
Surie, et al., "Activity Recognition Using an "Egocentric" Perspective of Everyday Objects", In International Conference on Ubiquitous Intelligence and Computing, Jul. 11, 2007, 16 Pages.
Tang, et al., "Action Recognition in RGB-D Egocentric Videos", In Proceedings of IEEE International Conference on Image Processing, Sep. 2017, 5 Pages.
Tejani, et al., "Latent-Class Hough Forests for 3D Object Detection and Pose Estimation", In Proceedings of 13th European Conference on Computer Vision, Sep. 6, 2014, pp. 462-477.
Tekin, et al., "Learning to Fuse 2D and 3D Image Cues for Monocular Body Pose Estimation", In Proceedings of IEEE International Conference on Computer Vision, Oct. 22, 2017, pp. 3941-3950.
Tekin, et al., "Real-Time Seamless Single Shot 6D Object Pose Prediction", In Proceedings of the Conference on Computer Vision and Pattern Recognition, Jun. 18, 2018, pp. 292-301.
Tsoli, et al., "Joint 3D Tracking of a Deformable Object in Interaction with a Hand", In Proceedings of 15th European Conference of Computer Vision, Sep. 8, 2018, 17 Pages.
Tzionas, et al., "Capturing Hands in Action Using Discriminative Salient Points and Physics Simulation", In International Journal of Computer Vision, vol. 118, Issue 2, Jun. 2016, 24 Pages.
Wong, et al., "Learning Motion Categories Using both Semantic and Structural Information", In Proceedings of IEEE Conference on Computer Vision and Pattern Recognition, Jun. 17, 2007, 6 Pages.
Ye, et al., "Occlusion-aware Hand Pose Estimation Using Hierarchical Mixture Density Network", In Proceedings of 15th European Conference on Computer Vision, Sep. 8, 2018, 16 Pages.
Yi, et al., "LIFT-Learned Invariant Feature Transform", In Proceedings of 14th European Conference on Computer Vision, Oct. 11, 2016, 16 Pages.
Yuan, et al., "BigHand2.2M Benchmark: Hand Pose Dataset and State of the Art Analysis", In Proceedings of IEEE Conference on Computer Vision and Pattern Recognition, Jul. 21, 2017, pp. 4866-4874.
Yuan, et al., "Depth-Based 3D Hand Pose Estimation: From Current Achievements to Future Goals", In Proceedings of IEEE/CVF Conference on Computer Vision and Pattern Recognition, Jun. 18, 2018, pp. 2636-2645.
Zimmermann, et al., "Learning to Estimate 3D Hand Pose from Single RGB Images", In Proceedings of IEEE International Conference on Computer Vision, Oct. 22, 2017, pp. 4903-4911.

\* cited by examiner

PREDICTING THREE-DIMENSIONAL ARTICULATED AND TARGET OBJECT POSE

BACKGROUND

Neural networks can be trained to estimate poses for hands or objects that are identified in images. Typically, these images include both color and depth data that are captured by a camera system including multiple visual light cameras and depth cameras. However, these multi-camera systems are expensive and power consuming, and produce data that is time consuming to process.

SUMMARY

A data processing system is provided. The data processing system may include a processor having associated memory, the processor being configured to execute instructions using portions of the memory to cause the processor to, at classification time, receive an input image frame from an image source. The input image frame may include an articulated object and a target object. The processor may further be caused to process the input image frame using a trained neural network configured to, for each input cell of a plurality of input cells in the input image frame predict a three-dimensional articulated object pose of the articulated object and a three-dimensional target object pose of the target object relative to the input cell. The processor may further be caused to output the three-dimensional articulated object pose and the three-dimensional target object pose from the neural network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
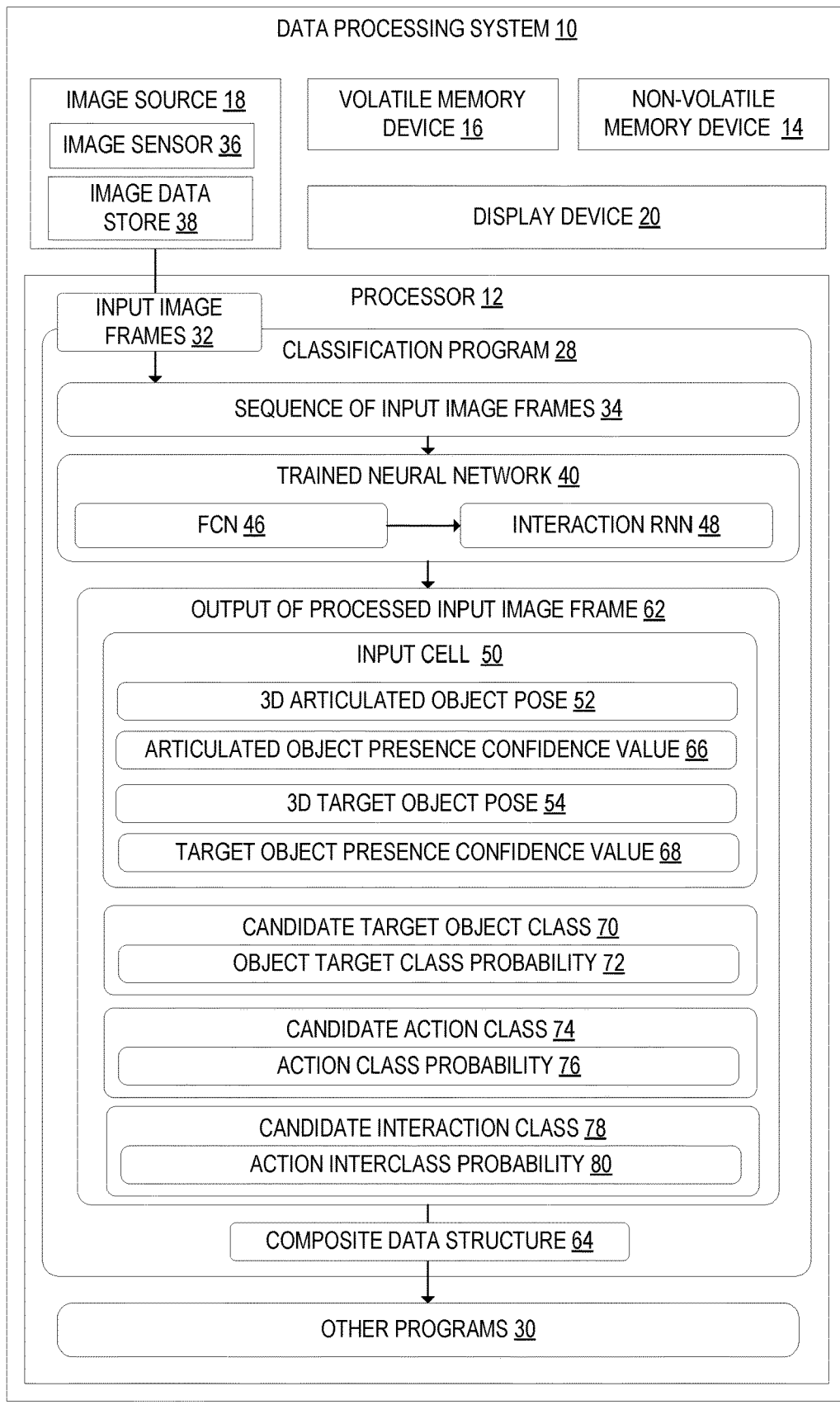
FIG. 1 shows a schematic view of a data processing system for jointly estimate three-dimensional articulated object and target object poses and recognize target objects and action classes according to one embodiment of the presented disclosure.

A significant amount of research has focused on visual understanding of hands and objects in isolation from each other. The inventors have recognized that current approaches for individual hand pose estimation methods often produce erroneous results when the hand is occluded by an object. These approaches typically rely on active depth sensors or multi-camera systems. However, depth sensors require relatively high-power consumption and are less prevalent than color cameras. On the other hand, multi-camera systems are expensive, and it may be difficult to calibrate a synchronous system of sensors.

The inventors also recognize that prior approaches suffer from the drawback that they cannot deduce any information about the action the subject is performing. While estimating the 3D hand pose is useful for many applications in robotics and graphics, the sole knowledge of an individual pose lacks any semantic meaning about the action being performed by the hand. These approaches also typically only capture hand motion without recovering the target object pose in three-dimensions and lack environmental understanding.

To address the issues discussed above, FIG. 1 illustrates an example data processing system 10 configured to jointly estimate three-dimensional articulated object and target object poses and recognize target objects and action classes. The data processing system 10 may include a processor 12, a non-volatile memory device 14, a volatile memory device 16, an image source 18, a display device 20, and other computer components not specifically illustrated in FIG. 1. The processor 12 may include associated memory and is configured to execute instructions using portions of the memory to perform the functions and processes described herein. In one example, the data processing system 10 may take the form of a desktop computing device, a laptop computing device, a large format display computing device, or another suitable form.

Figure 2:
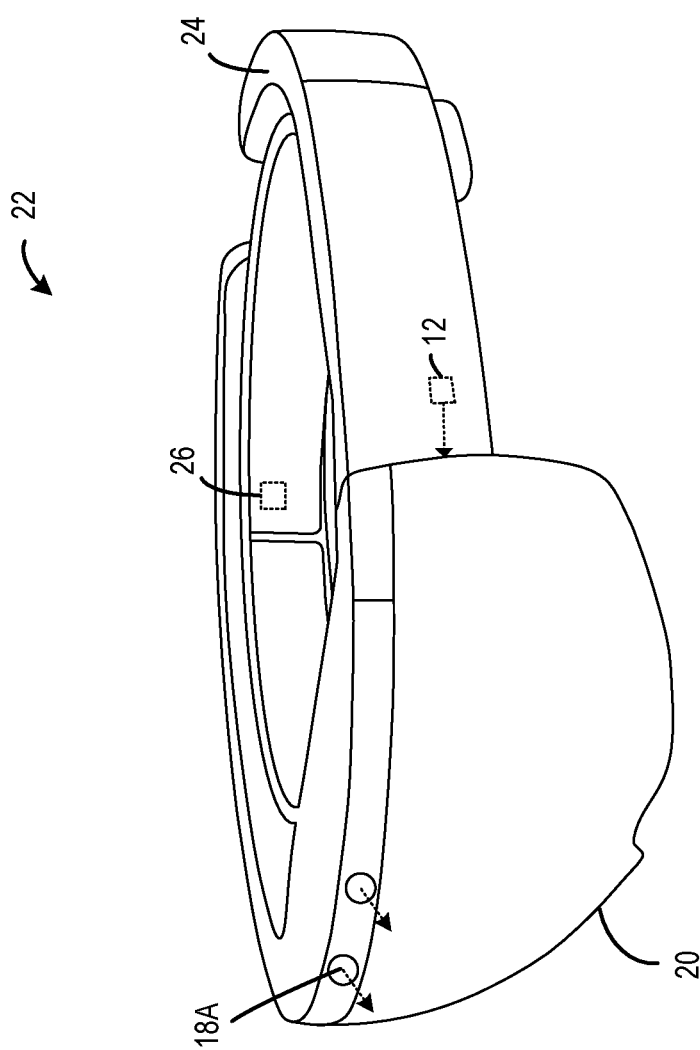
FIG. 2 shows an example head mounted display (HMD) device configuration of the data processing system of FIG. 1.

FIG. 2 illustrates an example head mounted display (HMD) device 22 configuration of the data processing system 10. The HMD device 22 may be worn by a user according to an example of the present disclosure. The HMD device 22 may include a frame 24 that wraps around the head of the user to position the display device 20, which takes the form of a near-eye display in this example, close to the user's eyes. In one example, the near-eye display 20 may take the form of a substantially non-see-through display in a virtual reality HMD device configuration. In other examples, the near-eye display 20 may take the form of an at least partially see-through display that is supported in front of a viewer's eye or eyes in an augmented reality HMD device configuration.

As illustrated in FIG. 2, the frame supports additional components of the HMD device 22, such as, for example, the processor 12 and the image source 18 in the form of one or more outward facing cameras 18A. The processor 12 includes logic and associated computer memory configured to provide image signals to the display device 20, to receive image data from the outward facing cameras 18A, and to enact various control processes described herein.

Any suitable display technology and configuration may be used to display images via the display device 20. For example, in a non-augmented reality configuration, the display device 20 may be a non-see-through Light-Emitting Diode (LED) display, a Liquid Crystal Display (LCD), or any other suitable type of non-see-through display. In an augmented reality configuration, the display device 20 may be configured to enable a wearer of the HMD device 22 to view a physical, real-world object in the physical environment through one or more partially transparent pixels displaying virtual object representations. For example, the display device 20 may include image-producing elements such as, for example, a see-through Organic Light-Emitting Diode (OLED) display.

As another example, the HMD device 22 may include a light modulator on an edge of the display device 20. In this example, the display device 20 may serve as a light guide for delivering light from the light modulator to the eyes of a wearer. In other examples, the display device 20 may utilize a liquid crystal on silicon (LCOS) display.

The one or more outward facing camera devices 18A may be configured to capture images of a scene in front of the HMD device 22. In one example, the one or more outward facing camera devices 18A may include a visible-light camera or RBG camera configured to collect a visible-light image of a physical space. Further, the one or more outward facing camera devices 18A may, in some examples, optionally include a depth camera configured to collect a depth image of a physical space. More particularly, in one example the depth camera is an infrared time-of-flight depth camera. In another example, the depth camera is an infrared structured light depth camera. In these examples, the image sensor may be configured to capture several different types of images, such as, for example, a grayscale image, a red-green-blue depth (RGBD) image, an infrared image, and/or an infrared-depth image.

Data from the outward facing camera devices 18A may be used by the processor 12 to generate and/or update a three-dimensional (3D) model of the physical environment. Data from the outward facing camera devices 18B may be used by the processor 12 to jointly estimate three-dimensional articulated object and target object poses and recognize target objects and action classes for articulated objects and target objects in the scene being captured by the outward facing camera devices 18A, as will be described in more detail below. In some examples, the articulated objects may include a human hand, and the target objects may include various rigid or soft body objects in the physical environment being interacted with by the human hand. However, it should be appreciated that other types of articulated objects may be identified using the methods and processes described herein. For example, the articulated objects may also include other articulated body parts, such as, for example, an elbow, a foot, a mouth, etc. As yet another example, the articulated objects may include non-human articulated objects, such as, for example, a robot grasper, a claw, articulated objects of an animal, and other types of mechanical and/or biological articulated objects that may interact with target objects in a physical environment.

In augmented reality configurations of HMD device 22, the position and/or orientation of the HMD device 22 relative to the physical environment may be assessed so that augmented-reality images may be accurately displayed in desired real-world locations with desired orientations. For example, processor 12 may execute instructions to generate a 3D model of the physical environment and perform simultaneous localization and mapping processes. In both augmented reality and non-augmented reality configurations of HMD device 22, one or more inertial measurement units (IMU) 26 of HMD device 22 may be configured to provide position and/or orientation data of the HMD device 22 to the processor 12. In one implementation, the IMU 26 may be configured as a three-axis or three-degree of freedom (3DOF) position sensor system. This example position sensor system may, for example, include three gyroscopes to indicate or measure a change in orientation of the HMD device 22 within 3D space about three orthogonal axes (e.g., roll, pitch, and yaw). The orientation derived from the sensor signals of the IMU may be used to display, via the display device 20, one or more holographic images with a realistic and stable position and orientation.

In another example, the IMU 26 may be configured as a six-axis or six-degree of freedom (6DOF) position sensor system. Such a configuration may include three accelerometers and three gyroscopes to indicate or measure a change in location of the HMD device 22 along three orthogonal spatial axes (e.g., x, y, and z) and a change in device orientation about three orthogonal rotation axes (e.g., yaw, pitch, and roll). In some implementations, position and orientation data from the outward facing camera devices 18A and the IMU 26 may be used in conjunction to determine a position and orientation (or 6DOF pose) of the HMD device 22.

In some examples, a 6DOF position sensor system may be used to display holographic representations in a world-locked manner. A world-locked holographic representation appears to be fixed relative to one or more real world objects viewable through the HMD device 22, thereby enabling a wearer of the HMD device 22 to move around a real-world physical environment while perceiving a world-locked hologram as remaining stationary in a fixed location and orientation relative to the one or more real world objects in the physical environment.

Turning back to FIG. 1, the processor 12 of the data processing system 10 may be configured to execute a classification program 28 and one or more other programs 30. In one example, the classification program 28 may be included in an operating system executed on the data processing system 10. In another example, the classification program 28 may be included in one or more application programs being executed on the data processing system 10. As illustrated in FIG. 1, the classification program 28 may be configured to receive input image frames 32 in a sequence of input image frames 34 from the image source 18. In one example, the image source 18 may take the form of an image sensor 36 that is configured as a visual light camera being configured to capture visual light, such as, for example, the one or more outward facing cameras 18A of the HMD device 22 configuration of the data processing system 10. In another example, the image source 18 may optionally or alternatively include an image sensor 36 that is configured as a depth camera configured to capture infrared light, as discussed above. However, it should be appreciated that the image sensor may take other suitable forms, such as a camera system that is separate from the data processing system 10 in a non-HMD device configuration, such as a desktop computer device.

In another example, the image source 18 may take the form of an image data store 38 configured to store one of more input image frames 32. The image data store 38 may be located in memory of the data processing system 10 or may be located on a server separate from the data processing system 10. Each input image frame 32 in the sequence of input image frames 34 may be received from the image data store 38. The processor 12 may be configured to process the received input image frames 32 using a trained neural network 40 according to processes and methods described herein.

Figure 3:
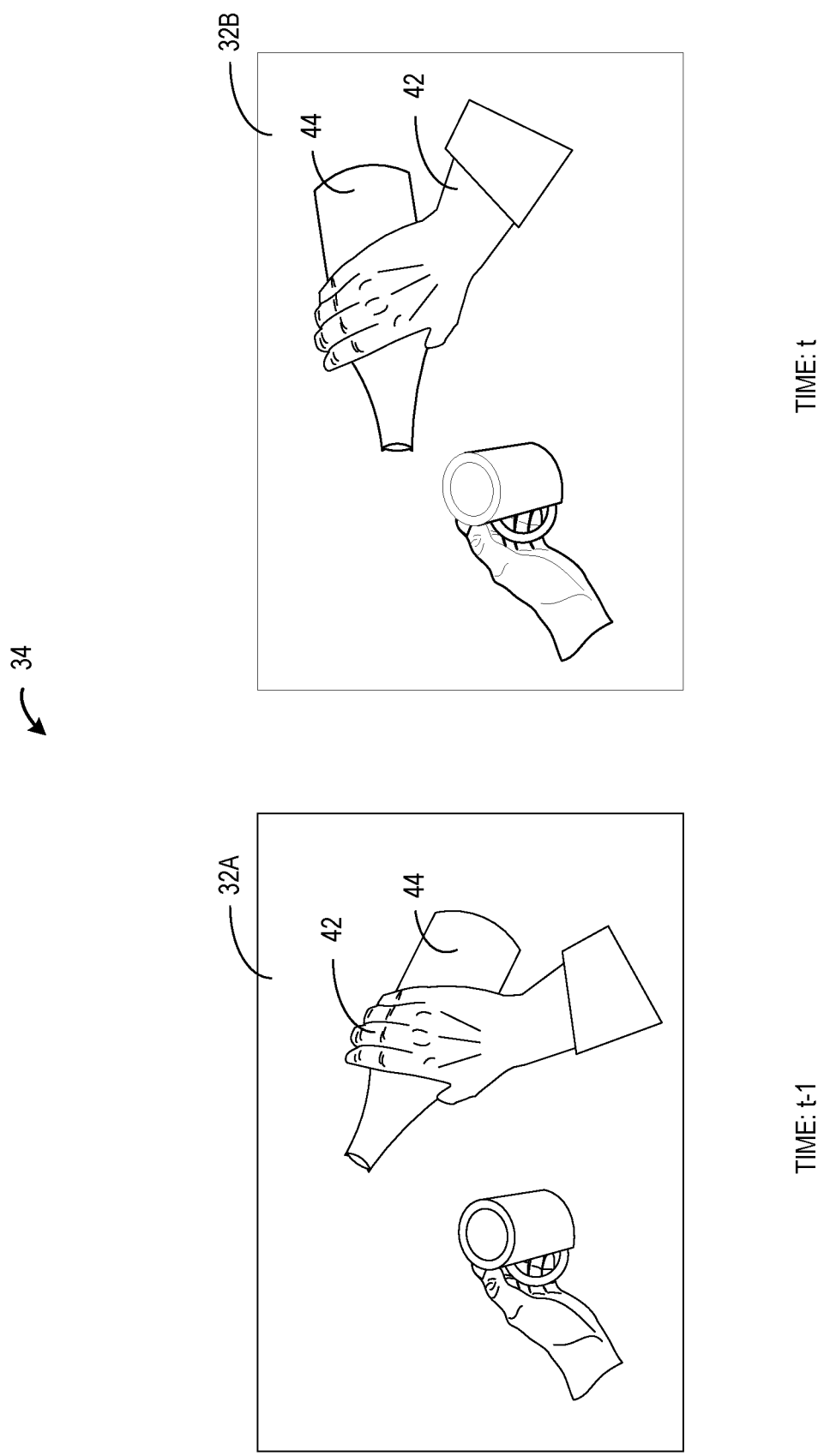
FIG. 3 shows a sequence of input image frames that are processed by the data processing system of FIG. 1.

FIG. 3 illustrates an example sequence of input image frames 34. The sequence of input image frames 34 includes a first input image frame 32A captured at a time t−1, and a second input image frame 32 captured at a time t. Both the first and second input image frames are received from the image source 18. The first and second input image frames 32 include an articulated object 42 in the form of a human hand and a target object 44, and may include other scene components such as background objects. As discussed above, in other examples, the articulated object 42 may include other types of articulated objects, such as, for example, a mouth of the user interacting with a sandwich target object (e.g. human mouth eating sandwich. As another example, the articulated object 42 may include a foot kicking a target object in the form of a ball. It should be appreciated that the articulated objects 42 and target objects 44 may take any suitable form, and are not limited to the specific examples described herein and illustrated in the drawings. The first and second input images frames 32 may, in some examples, include more than one articulated object 42 and more and one target object 44 that may each be processed according to the methods and processes described herein. In one example, the first and second input image frames 32 are captured as monocular color images by a visual light camera. Using these monocular color images, the processor 12 of the data processing system 10 may be configured to jointly estimate three-dimensional articulated object and target object poses and recognize objects and action classes for the articulated object 42 and the target object 44. In another example, the input image frames 32 may also include depth data captured by a depth camera. In these examples, the depth data may be used during depth estimation processes described herein.

The sequence of input image frames 34 is processed by the trained neural network 40 of the classification program 28. As illustrated in FIG. 1, the trained neural network 40 may include a fully convolutional neural network 46, or another suitable type of artificial intelligence learning model. More specifically, in one example, the trained neural network 40 may be configured as a single shot feedforward fully convolutional neural network that jointly estimates three-dimensional articulated object and target object poses and recognizes target objects and action classes concurrently in a feed-forward pass through of the neural network. The trained neural networked 40 may, in some examples, further include a recurrent neural network (RNN) 48 that is referred to as an interaction RNN and configured to processes data received from the fully convolutional neural network to model interactions between articulated objects and target objects. More particularly, the fully convolutional neural network 46 may be configured to process single input image frames 32 to determine highest confidence predictions for three-dimensional articulated object and target object poses at each input image frame 32, and pass those predictions as input to the interaction recurrent neural network 48, which may be configured to model longer-term dependencies across the sequential image input frames 32, such as actions being performed on the object. A specific implementation of the convolutional neural network 46 and the interaction recurrent neural network 48 is described in detail with reference to FIG. 5

As illustrated in FIG. 1, the processor 12 may be configured to process the input image frame 32 using the trained neural network 40 configured to, for each input cell 50 of a plurality of input cells in the input image frame 32 predict a three-dimensional articulated object pose 52 of the articulated object 42 and a three-dimensional target object pose 54 of the target object 44 relative to the input cell 50. In one example, the processor 12 may be configured to divide the input image frame 32 into a regular grid containing H×W×D cells that span the three-dimensional scene that was captured in the input image frame 32. In this example, each input cell may be a pixel or region of pixels of the divided input image frame 32. An example regular grid of input cells is illustrated with reference to FIG. 5. Additionally, in the example regular grid of input cells illustrated in FIG. 5, each input cell further represents a depth in the scene captured by the input image frame 32. In examples where the input image frame 32 is a monocular color image captured by a visible light camera, the depth of the scene may be estimated by the trained neural network 40 using techniques that will be described with reference to FIG. 5. On the other hand, in examples where the input image frame 32 further includes depth data captured by a depth camera, the depth of the scene for each input cell may be calculated based on the depth data.

In one example, the three-dimensional articulated object pose 52 and the three-dimensional target object pose 54 may include data that respectively indicates a plurality of control points 58 that represent the articulated object and target object poses. FIG. 4A illustrates the example input image frame 32 overlaid with an example three-dimensional articulated object pose 52 and an example three-dimensional target object pose 54 generated by the trained neural net 40 after processing the input image frame 32.

Figure 4B:
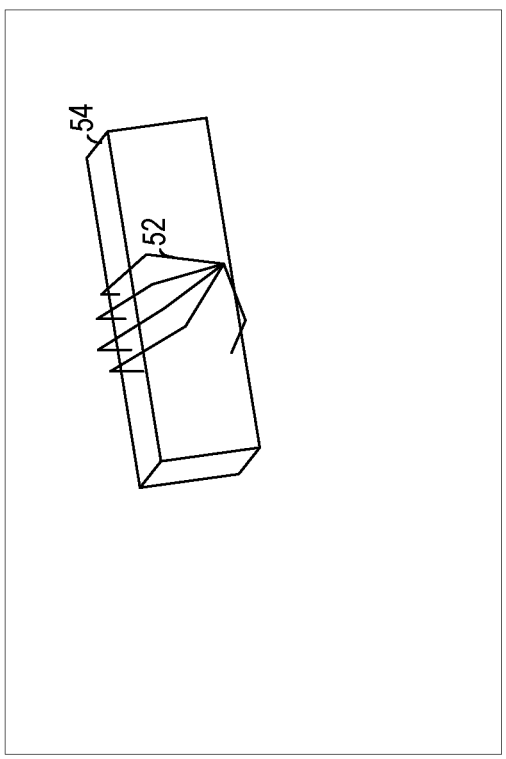
FIG. 4B shows an example three-dimensional articulated object pose and three-dimensional target object pose predicted by the data processing system of FIG. 1.

FIG. 4B shows a view of the example three-dimensional articulated object pose 52 and the example three-dimensional target object pose 54 separate from the image data of the input image frame 32. As illustrated, the example three-dimensional articulated object pose 52 is a skeletal representation of a human hand that represents the phalanges and joints of a human hand. The phalanges and joints of the skeletal representation may be positioned and orientated based on the hand 42 captured in the input image frame 32. The processor may be further configured to estimate a hand surface based on the hand joints estimated in the skeletal representation of the hand 42. It should be appreciated that while the illustrated articulated object pose is a skeletal representation of a hand, the articulated object pose may take other forms that are suitable to the specific articulated object 42. For example, a skeletal mouth or skeletal foot model may be used to model respective mouth or foot articulated objects. The example three-dimensional target object pose 54 is a bounding box that is sized and positioned to encompass the volume of the target object 44 captured in the input image frame 32. It should be appreciated that while the three-dimensional target object pose 54 is illustrated as a box shape, the three-dimensional target object pose 54 may be represented as other types of bounding shapes such as a sphere, a pyramid, and other three-dimensional geometric shapes.

The three-dimensional articulated object pose 52 and the three-dimensional target object pose 54 are represented as a set of control points 58 that are indicated in the output of the trained neural network 40. FIG. 4C illustrates the example three-dimensional target object pose 54 represented by a bounding box. In the illustrated example, the bounding box is defined by eight control points 54 at each corner of the bounding box. In one example, the bounding box may be further defined by a centroid control point 60 that is placed at a centroid of the target object 42 in the input image frame 32. However, it should be appreciated that any suitable number of control points 58 may be used to define the bounding box. For example, the bounding box may be further defined by another twelve control points 58 located on the edges that span between each of the eight control points 58 illustrated in FIG. 4C. Further, it should be appreciated that other types of bounding shapes such as spheres, pyramids, and other three-dimensional geometric shapes may be represented by a different number and set of control points 58.

Figure 4D:
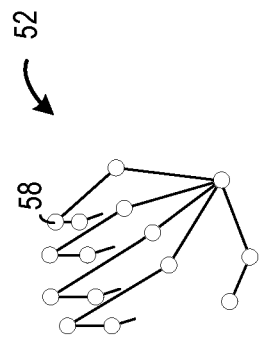
FIG. 4D shows an example set of control points for the three-dimensional articulated object pose predicted by the data processing system of FIG. 1.
Figure 4A:
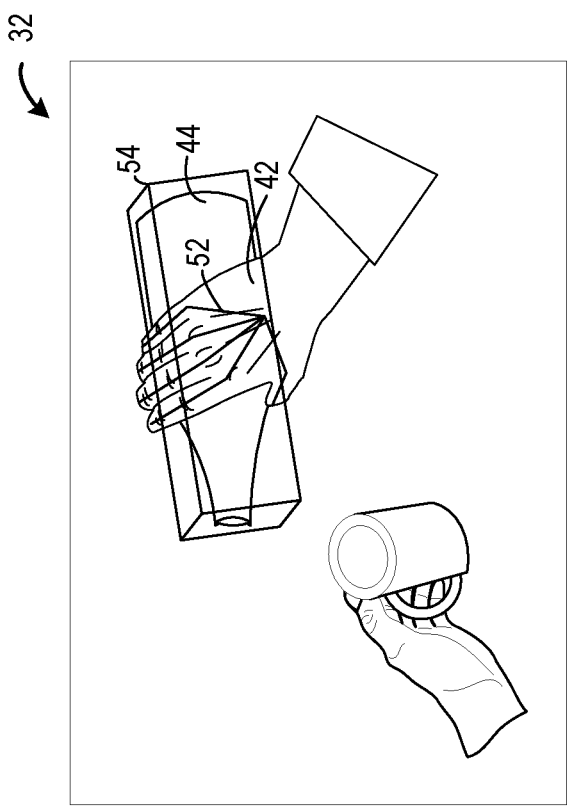
FIG. 4A shows an input image frame illustratively annotated with a bounding box and a skeletal hand representation for the data processing system of FIG. 1.
Figure 4C:
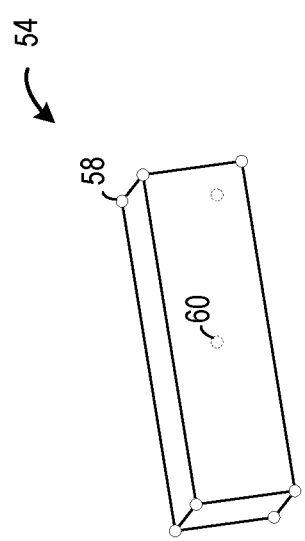
FIG. 4C shows an example set of control points for the three-dimensional target object pose predicted by the data processing system of FIG. 1.

FIG. 4D illustrates the example three-dimensional articulated object pose 52 represented by a skeletal representation that is defined by a set of control points 58 located at each joint of the skeletal representation. Control points may also be located at the fingertips of the skeletal representation, at a palm position of the skeletal representation, and/or at a wrist position of the skeletal representation. It should be appreciated that any suitable number of control points 58 may be used to define the skeletal representation of the three-dimensional articulated object pose 52. In one specific example, a set of twenty-one control points may be used to define the three-dimensional articulated object pose 52. Additionally, it should be appreciated that the number of control points 58 and the positional relationships between those control points 58 may be configured to the specific type of articulated object 42 in the input image frame. That is, a mouth articulated object, a foot articulated object, and other types of articulated objects may have different representations defined by a different set of control points 58.

As illustrated in FIG. 1, the processor 12 may be configured to output the three-dimensional articulated object pose 52 and the three-dimensional target object pose 54 from the neural network 40 as the output of processed input image frame 62. In one example, the output 62 may be passed to one or more other programs 30 for downstream processing. These other programs 30, may, for example, include third party applications that are developed to use the output 62. In one example, the output 62 from the trained neural network 40 may be included in a composite data structure 64 such as a parameterized tensor vector, which will be described in more detail with reference to FIG. 5. As illustrated in the example of FIG. 1, the output 62 from the trained neural network 40 may further include other types of data, such as, for example, an articulated object presence confidence value 66, a target object presence confidence value 68, a candidate target object class 70 and an target object class probability 72, and a candidate action class 74 and action class probability 76. It should be appreciated that the three-dimensional articulated object pose 52, the three-dimensional target object pose 54, the candidate target object class 70, and the candidate action class 74 are jointly determined by the trained neural network 40, as will be described in more detail with reference to FIG. 5.

Figure 5:
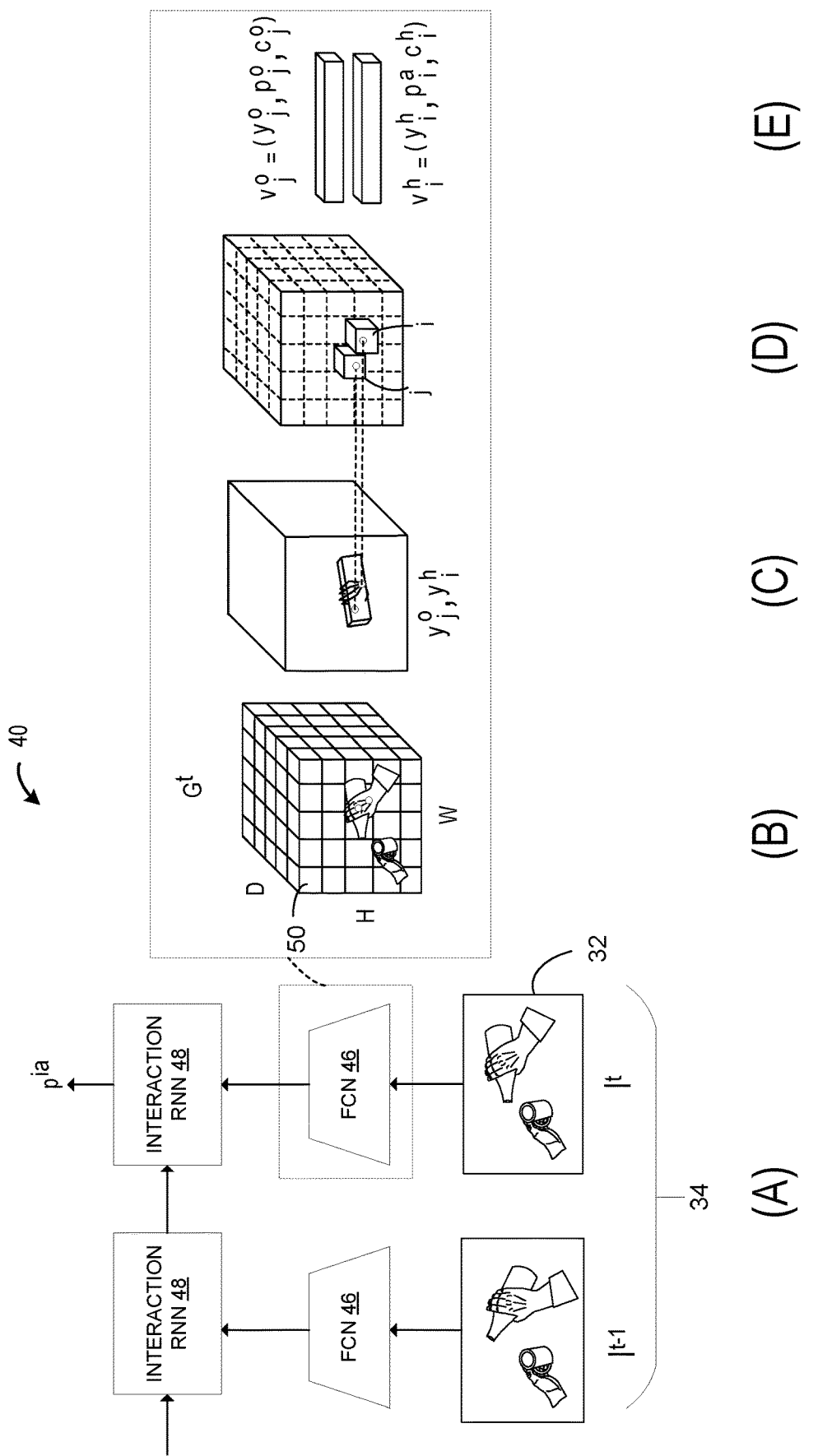
FIG. 5 shows an example trained neural network executed by the data processing system of FIG. 1.

FIG. 5 illustrates a schematic overview of an example trained neural network 40 processing an example input image frame 32. At (A), FIG. 5 illustrates an example neural network architecture. Each input image frame $I^t$ of the sequence of input image frames 34 may be passed through a fully convolutional neural network (FCN) 46 to produce a three-dimensional regular grid $G^t$ of input cells 50. At (B), FIG. 5 illustrates the H×W×D grid showing the input cells 50 configured for recognizing articulated objects 42 and target objects 44 using the FCN 46. At (C), FIG. 5 illustrates that each input cell 50 predicts the three-dimensional articulated object pose 52 represented by a skeletal hand representation and the three-dimensional target object pose 54 represented by bounding box coordinates in a three-dimensional grid. At (D), FIG. 5 illustrates that the trained neural network 40 outputs a parameterized tensor vector in which target values for the three-dimensional articulated object pose 52 and three-dimensional target object pose 54 are stored. At (E), FIG. 5 illustrates that the input cells 50 are associated with a parameterized tensor vector that contains target values for the three-dimensional articulated object pose 52 and three-dimensional target object pose 54, a candidate target object class 70 and target object class probability 72, and a candidate action class 74 and action class probability 76, and in some examples, an overall confidence value for the prediction. Predictions from the FCN 46 with high confidence values are then passed through the interaction RNN 48, as illustrated at (A), to propagate information in a temporal domain and model interactions in three-dimensions between articulated objects 42 and target objects 44.

The trained neural network 40 takes as input a sequence 34 of input image frames 32 $I^t$ ($1 \leq t \leq N$) and predicts per-frame three-dimensional articulated object poses 52, three-dimensional target object poses 54, candidate target object classes 70, candidate action classes 74, along with per-sequence 34 interaction classes. In one example, the candidate action classes 74 may be defined as verb, such as, for example, pour, close, open, etc. Interaction classes may be defined as <verb, noun> pairs, such as, for example, <pour, juice>, <close, bottle>, <open, bottle>, etc. As discussed with reference to FIG. 4, three-dimensional articulated object poses 52 and three-dimensional target object poses 54 may be defined with $N_c$ three-dimensional control points 58. The number of candidate target object classes 70 is denoted by $N_o$, the number of candidate action classes is denoted by $N_a$ and the number of interaction classes is denoted by $N_{ia}$.

As illustrated in FIG. 5, the trained neural network 40 is configured to first process each input image frame 32, $I^t$, of a sequence 34 with the fully convolutional network 46 and divide the input image frame 32 into a regular grid $G^t$ containing H×W×D input cells 50 that span the three-dimensional scene captured in the input image frame 32. The target values of the output from the trained neural network 40 for articulated objects and target objects are stored in tensor $G^t$. Specifically, the target values for a articulated object or a target object at a specific input cell 50 location, $i \in H \times W \times D$, may be placed in the $i$-th cell of $G^t$ in the form of a multi-dimensional vector, $V_i$. To jointly predict the three-dimensional articulated object pose and the three-dimensional target object pose when the articulated object and target object are potentially occluding each other, the trained neural network 40 may be configured to allow each input cell 50 to store two separate sets of values, one for the articulated object, denoted by $V_i^h$, and one for the target object, denoted by $V_i^o$. Vector $V_i^h$ stores the control points 58 for the three-dimensional articulated object pose 52, $y_i^h$ $\mathbb{R}^{3N_c}$, candidate action classes and probabilities, $p_i^a \in \mathbb{R}^{N_a}$, and an overall confidence value for the articulated object pose estimation, $c_i^h \in [0,1]$. Vector $V_i^o$ stores the control points 58 for the three-dimensional target object pose 54, $y_i^o \in \mathbb{R}^{3N_c}$, candidate target object classes and probabilities, $p_i^o \in \mathbb{R}^{N_o}$, and an overall confidence value for the target object pose estimation, $c_i^o \in [0,1]$.

In one example, predictions at input cells 50 having low confidence values, i.e. where the articulated objects or target objects of interest are not present, are pruned. In one example, these predictions are obtained with a single forward pass in the trained neural network. Further, the trained neural network 40 further includes an interaction recurrent neural network 48 that is utilized to compute the one or more candidate action classes 74 and action class probabilities 76. The interaction recurrent neural network 48 is configured to integrate information across input image frames processed by the FCN 46 and model the interaction between articulated objects and target objects. In one example, the interaction recurrent neural network 48 takes as input articulated object and target object predictions with high confidence values, and outputs a probability vector, $p^{ia} \in \mathbb{R}^{N_{ia}}$, over interaction classes.

A specific implementation of the trained neural network 40 will now be described with reference to FIG. 5. As discussed above, the trained neural network 40 may be configured to subdivide the input image frame 32 into a grid of H×W input cells 50, and further discretize depth into D cells. In examples where the input image frames 32 are monocular color images, the depth may be estimated by the trained neural network 40. In examples where the input images frames 32 include depth data, the depth data may directly be used to discretize depth into D cells of the grid. In these examples, discretization may be defined in pixel space for the first two dimensions, and in metric space for depth. Therefore, each input cell 50 has a size of $C_u \times C_v$ pixels, $\times C_z$ meters.

In one example, to predict each of the three-dimensional articulated object pose 52 and three-dimensional target object pose 54, the trained neural network 40 may be configured to estimate offsets $\Delta u$, $\Delta v$, $\Delta z$ from a predetermined location in the input cell 50 to each of a plurality of a control points 58 for the three-dimensional articulated object pose 52 and three-dimensional target object pose 54. That is, within each input cell 50, the trained neural network 40 may be configured to predict offsets $\Delta u$, $\Delta v$, $\Delta z$ for the locations corresponding to the control points 58 with respect to a predetermined location in the input cell 50, such as, for example, the top-left corner of the input cell, (u, v, z). However, it should be appreciated that other predetermined locations in the input cells 50 may also be used as references for the offsets, such as, for example, a center of the input cell 50.

In one example, the offset for a hand root joint control point and an object centroid control point may be constrained to lie between 0 and 1. Offsets for the other control points may not be constrained in the trained neural network's 40 output so that those control points may be allowed to fall outside the input cell 50. The predicted location of the control point $(\hat{\omega}_u, \hat{\omega}_v, \hat{\omega}_z)$ may then be computed as:

$$\hat{\omega}_u = g(\Delta u) + u \quad (1)$$

$$\hat{\omega}_v = g(\Delta v) + v \quad (2)$$

$$\hat{\omega}_z = g(\Delta z) + z \quad (3)$$

In these equations, g(•) is chosen to be a 1D sigmoid function for the root joint control point and the object centroid control point, and the identity functions for other control points in the three-dimensional articulated object and target object pose predictions. Given the intrinsics matrix K, the three-dimensional location $\hat{y}$ of a particular control point 58 in a coordinate system of the camera that captured the input image frame 32 is then computed as:

$$\hat{y} = \hat{\omega}_z \cdot C_z \cdot K^{-1} [\hat{\omega}_u \cdot C_u, \hat{\omega}_v \cdot C_v, 1]^T \quad (4)$$

The set of control points 58 that represent the joint coordinate predictions define the three-dimensional articulated object pose 52. For the three-dimensional target object pose 44, the processor 12 may be configured to, based on the estimated offsets $(\hat{\omega}_u, \hat{\omega}_v, \hat{\omega}_z)$, estimate a six degrees of freedom (6DoF) vector from the estimated offsets $(\hat{\omega}_u, \hat{\omega}_v, \hat{\omega}_z)$ by applying a transformation to the estimated offsets $(\hat{\omega}_u, \hat{\omega}_v, \hat{\omega}_z)$. That is, given the control point 58 predictions for the three-dimensional bounding box of the three-dimensional target object pose 54, a 6DoF vector may be computed efficiently by aligning the prediction to a reference three-dimensional bounding box with a rigid transformation. In one example, the transformation may be a Procrustes transformation that recovers the 6DoF pose.

In one example, the trained neural network 40 may be further configured to process the input image frame 32 by, for each input cell 50 of the plurality of input cells in the input image frame 32, computing an articulated object presence confidence value 66 and a target object presence confidence value 68 for the input cell 50. For example, the trained neural network 40 may be configured to predict high confidence values for input cells 50 where the articulated object 42 or the target object 44 are identified as being present, and low confidence values where they are not identified as being present. In one example, the articulated object presence confidence value 66 and the target object presence confidence value 68 may be computed based upon respective Euclidean distances of the predicted three-dimensional articulated object pose 52 and the predicted three-dimensional target object pose 54 to corresponding ground truths of the articulated object pose and target object pose of the trained neural network 40. In one example, given a predicted 2D location $(\hat{\omega}_u, \hat{\omega}_v)$ and its Euclidean distance $D_T(\hat{\omega}_u, \hat{\omega}_v)$ from the ground truth, measured in image space, the confidence value $C_{uv}(\hat{\omega}_u, \hat{\omega}_v)$ may be computed as an exponential function with cut-off value $d_{th}$ and sharpness parameter $\alpha$:

$$C_{uv}(\hat{\omega}_u, \hat{\omega}_v) = e^{\alpha\left(1 - \frac{D_T(\hat{\omega}_u, \hat{\omega}_v)}{d_{th}}\right)} \quad (5)$$

if $D_T(\hat{\omega}_u, \hat{\omega}_v) < d_{th}$, and $C_{uv}(\hat{\omega}_u, \hat{\omega}_v) = 0$ otherwise. Additionally, for a given depth prediction, $\hat{\omega}_z$, the processor 12 may be configured to compute an additional confidence value, $c_z(\hat{\omega}_z)$, measuring the distance (in metric space) between a prediction and ground truth, as in equation (5). The processor 12 may then be configured to compute a final confidence value $c = 0.5 \cdot C_{uv}(\hat{\omega}_u, \hat{\omega}_v) + 0.5 \cdot c_z(\hat{\omega}_z)$.

In one example, the trained neural network 40 may be further configured to compute one or more candidate target object classes 70 for the target object 44 and a respective target object class probability 72 for each of the one or more candidate target object classes 70, and compute one or more candidate action classes 74 for the articulated object 42 and a respective action class probability 76 for each of the one or more action classes 74. In order to predict action classes, the trained neural network 40 may be configured to, at each input cell i, store into vector $v_i^h$, together with articulated object pose $y_i^h$ and the corresponding confidence value $c_i^h$, the target action class probabilities $p_i^h$. Similarly, to be able to predict target object classes, the trained neural network 40 may be configured to store into vector $v_i^o$, together with target object pose $y_i^o$ and the corresponding confidence value $c_i^o$, the target object class probabilities $p_i^o$.

In total $v_i^h$ stores $3 \cdot N_c + N_a + 1$ values and $v_i^o$ stores $3 \cdot N_c + N_o + 1$ values. The trained neural network 40 is trained according to a training method that will be described in more detail below, to be able to predict $v_i^h$ and $v_i^o$ for each cell i of the three dimensional grid $G_t$, for each t in the sequence 34 of input image frames 32. After predicting a particular verb and noun pair, the trained neural network 40 may be configured to recognize interaction classes from an input image frame 32.

In one example, the FCN 46 of the trained neural network 40 may be configured to compute the one or more candidate action classes and action class probabilities. However, while relatively simple action classes may be recognized by looking at single frames, relatively complex action classes may require modeling longer-term dependencies across sequential input image frames 32. Thus, an interaction recurrent neural network 48 may be utilized to compute the one or more candidate action classes 74 and action class probabilities 76. In one example, to train the interaction RNN 48, a composite input of three-dimensional articulated object pose 52 and three-dimensional target object pose data 54 is fed to the interaction RNN 48 to enable the interaction RNN 48 to learn dependencies between the three-dimensional articulated object pose 52 and three-dimensional target object pose 54. In one specific example, the interaction RNN 48 may be configured to use a Long Short-Term Memory (LSTM). In another specific example, the interaction RNN 48 may be configured to use Gated Recurrent Units. However, it should be appreciated that other types of recurrent models may also be used in the interaction RNN 48.

In one example approach, to compute the candidate action classes 74 and probabilities 76, the interaction RNN 48 may be configured to receive the highest confidence predictions for three-dimensional articulated object poses 52 and three-dimensional target object poses 54 at each input image frame 32 from the FCN 46. The interaction RNN 48 may then be configured to process the output using a softmax layer to compute the candidate action class 74 and action class probability 76.

In another example approach, the interaction RNN 48 may be configured to reason about interactions between articulated objects 42 and target objects 44. For example, the trained neural network 40 may be configured to model dependencies between articulated objects 42 and target objects 44 with a composite learned function, and send the resulting mapping as input to interaction RNN 48:

$$f_\phi(g_\theta(\hat{y}^h, \hat{y}^o)) \qquad (6)$$

where $f_\phi$ is an LSTM and $g_\theta$ is an Multilayer Perceptrons (MLP), parameterized by $\phi$ and $\theta$, respectively. Given this mapping, the interaction RNN 48 may be configured to learn the explicit dependencies between articulated object and target object poses and models interactions.

Turning back to FIG. 1, after the output 62 from the trained neural network 40 has been computed, the processor 12 may be configured to output the three-dimensional articulated object pose 52, the three-dimensional target object pose 54, the one or more candidate target object classes 70 and the target object class probabilities 72, and the one or more candidate action classes 74 and action class probabilities 76 in a composite data structure 64 to a program 30 for downstream processing. As discussed above, in one example, the composite data structure 64 may take the form of a parameterized tensor vector. The other programs 30 may be configured to receive the output of the trained neural network 40 in the composite data structure 64, and perform downstream processing on the output 62. For example, the other program 30 may include an augmented reality application that is configured to display holograms to the user via the display device 20 based on the articulated object and target object poses in the output 62 from the trained neural network 40. The final layer of the trained neural network 40 produces, for each cell i, articulated object and target object pose predictions, $\hat{t}_i^h$ and $\hat{y}_i^o$, with their overall confidence values, $\hat{c}_i^h$ and $\hat{c}_i^o$, as well as probabilities for actions $\hat{p}_i^a$, and target object classes, $\hat{p}_i^o$.

Figure 6:
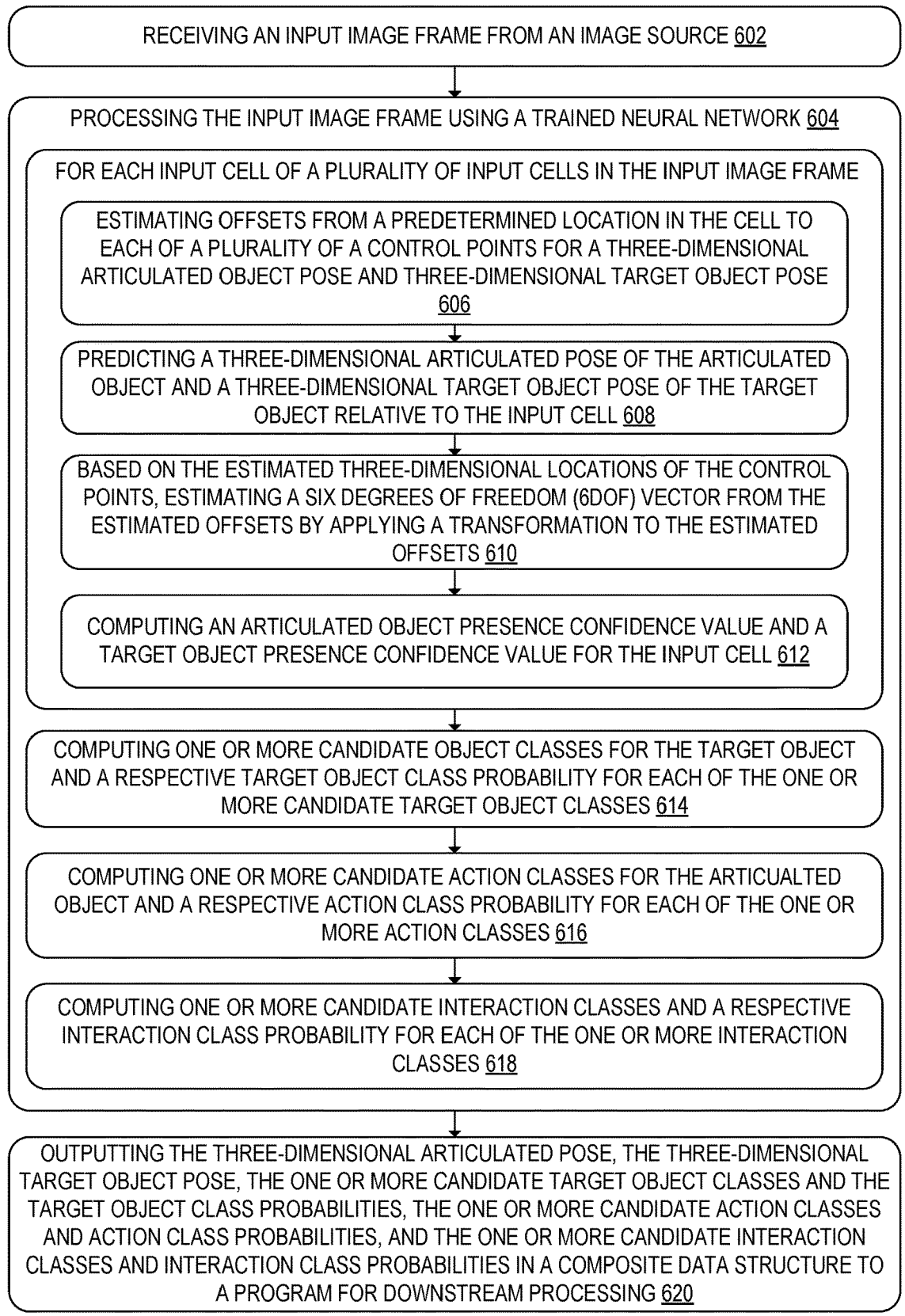
FIG. 6 shows a flowchart of an example method for jointly estimating three-dimensional articulated object and target object poses and recognize target objects and action classes using the data processing system of FIG. 1.

FIG. 6 shows a flowchart for a computer-implemented method 600 for jointly estimating three-dimensional articulated object and target object poses and recognizing target objects and action classes for input image frames 32. The method 600 may be implemented by the data processing system 10 illustrated in FIG. 1.

At 602, the method 600 may include receiving an input image frame 32 from an image source 18, the input image frame 32 including an articulated object 42 and a target object 44. An example sequence of input image frames 34 is illustrated with reference to FIG. 3. The sequence of input image frames 34 includes the first input image frame 32 captured at a time t−1, and the second input image frame 32 captured at a time t. Both the first and second input image frames are received from the image source 18. The first and second input image frames 32 include an articulated object 42 and a target object 44. In one example, the first and second input image frames 32 are captured as monocular color images by a visual light camera. In another example, the input image frames 32 may also include depth data captured by a depth camera.

At 604, the method 600 may include processing the input image frame 32 using a trained neural network 40. An example trained neural network 40 is illustrated with reference to FIG. 5. The trained neural network 40 may be configured as a fully convolutional neural network, or another suitable type of artificial intelligence learning model. More specifically, in one example, the trained neural network 40 may be configured as a single shot feedforward fully convolutional neural network that jointly estimates three-dimensional articulated object and target object poses and recognizes target objects and action classes concurrently in a feed-forward pass through of the neural network.

At 604, processing the input image frame 32 may include steps 606-612. At 606, the method 600 may include estimating offsets from a predetermined location in the cell to each of a plurality of a control points 58 for the three-dimensional articulated object pose 52 and the three-dimensional target object pose 54. Estimated offsets Δu, Δv, Δz are described above with reference to FIG. 5. Specifically, the offsets are estimated for the locations corresponding to the control points 58 with respect to a predetermined location in the input cell 50, such as, for example, the top-left corner of the input cell that is closer to a viewpoint of the camera that captured the input image frame than a top-left corner that is farther from viewpoint of the camera, (u, v, z). However, it should be appreciated that other predetermined locations in the input cells 50 may also be used as references for the offsets, such as, for example, a center of the input cell 50.

At 608, the method 600 may include for each input cell 46 of a plurality of input cells in the input image frame 32 predicting a candidate three-dimensional articulated object pose 48 of the articulated object 42 and a candidate three-dimensional target object pose 50 of the target object 44. An example three-dimensional articulated object pose 52 and three-dimensional target object pose 54 are illustrated with reference to FIGS. 4C and 4D. The three-dimensional articulated object pose 52 and the three-dimensional target object pose 54 may be defined by a set of control points 58 that are predicted by the input cells of the trained neural network 40 configured to process the input image frame 32. As will be discussed below, pose estimates with a low confidence value may be pruned. The remaining candidate pose estimates having a high confidence value may then be treated as valid pose estimates and used for the three-dimensional articulated object pose 48 and the three-dimensional target object pose 54. It should be appreciated that jointly estimating both articulated object and target object poses may provide the potential benefit of increased prediction accuracy of the target object pose estimations.

At 610, the method 600 may include based on the estimated three-dimensional locations of the control points, estimating a six degrees of freedom (6DoF) vector from the estimated offsets by applying a transformation to the estimated offsets. For example, given the control point 58 predictions for the three-dimensional bounding box of the three-dimensional target object pose 54 illustrated in FIG. 4C, a 6DoF vector may be computed efficiently by aligning the prediction to a reference three-dimensional bounding box with a rigid transformation. In one example, the transformation may be a Procrustes transformation that recovers the 6DoF pose.

At 612, the method 600 may include computing an articulated object presence confidence value and a target object presence confidence value for the input cell. For example, the trained neural network 40 may be configured to predict high confidence values for input cells 50 where the articulated object 42 or the target object 44 are identified as being present, and low confidence values where they are not identified as being present. In one example, the articulated object presence confidence value 66 and the target object presence confidence value 68 may be computed based upon respective Euclidean distances of the predicted three-dimensional articulated object pose 52 and the predicted three-dimensional target object pose 54 to corresponding ground truths of the articulated object pose and target object pose of the trained neural network 40, as described above with reference to FIG. 5.

At 614, the method 600 may include computing one or more candidate target object classes for the target object and a respective target object class probability for each of the one or more candidate target object classes. The trained neural network 40 may be trained to recognize candidate target object classes 70 based on features of the target object in the input image frame identifiable by the trained neural network 40, as well as joint features that are shared among the tasks of the neural network. As discussed above with reference to FIG. 5, the candidate target object classes may include a prediction of a <noun> for the target object, and a respective confidence value for that prediction. For example, these target object classes may include predictions such as <bottle>, <ball>, <milk jug>, <juice>, etc.

At 616, the method 600 may include computing one or more candidate action classes for the articulated object and a respective action class probability for each of the one or more action classes. As discussed above with reference to FIG. 5, the one or more candidate action classes and respective action class probabilities may include a prediction of a <verb>, such as, for example, <pour>, <close>, <open>, etc. The action class probabilities may indicate a degree of confidence for one or more candidate action class <verbs>.

At 618, the method 600 may include computing one or more candidate interaction classes 78 and a respective interaction class probability 80 for each of the one or more interaction classes 78. The candidate action class predictions may be combined with the candidate target object class predictions of step 614 by concatenating the <verb> and <noun> predictions to compute a candidate interaction class, such as, for example, <open, bottle>, <pour, juice>, etc. In one example, the FCN may be configured to compute one or more candidate interaction classes for an input image frame in this manner. However, to model longer term dependencies and temporally reason over a sequence of input image frames, the three-dimensional articulated object pose, three-dimensional target object pose, candidate action class probabilities, and candidate target object class probabilities may be sent to the interaction RNN, as illustrated in FIG. 5.

To train the interaction RNN 48, a composite input of the three-dimensional articulated object pose, three-dimensional target object pose, candidate action class probabilities, and candidate target object class probabilities is fed to the interaction RNN 48 to enable the interaction RNN 48 to learn dependencies between the three-dimensional articulated object pose 52 and three-dimensional target object pose 54. In one specific example, the interaction RNN 48 may be configured to use a Long Short-Term Memory (LSTM). In another specific example, the interaction RNN 48 may be configured to use Gated Recurrent Units. However, it should be appreciated that other types of recurrent models may also be used in the interaction RNN 48.

At 620, the method 600 may include outputting the three-dimensional articulated object pose, the three-dimensional target object pose, the one or more candidate target object classes and the target object class probabilities, the one or more candidate action classes and action class probabilities, and the one or more candidate interaction classes and interaction class probabilities in a composite data structure to a program for downstream processing. In one example, the composite data structure is a parameterized tensor vector. However, it should be appreciated that the output from the trained neural network 40 may be contained in other types of composite data structures.

Figure 7:
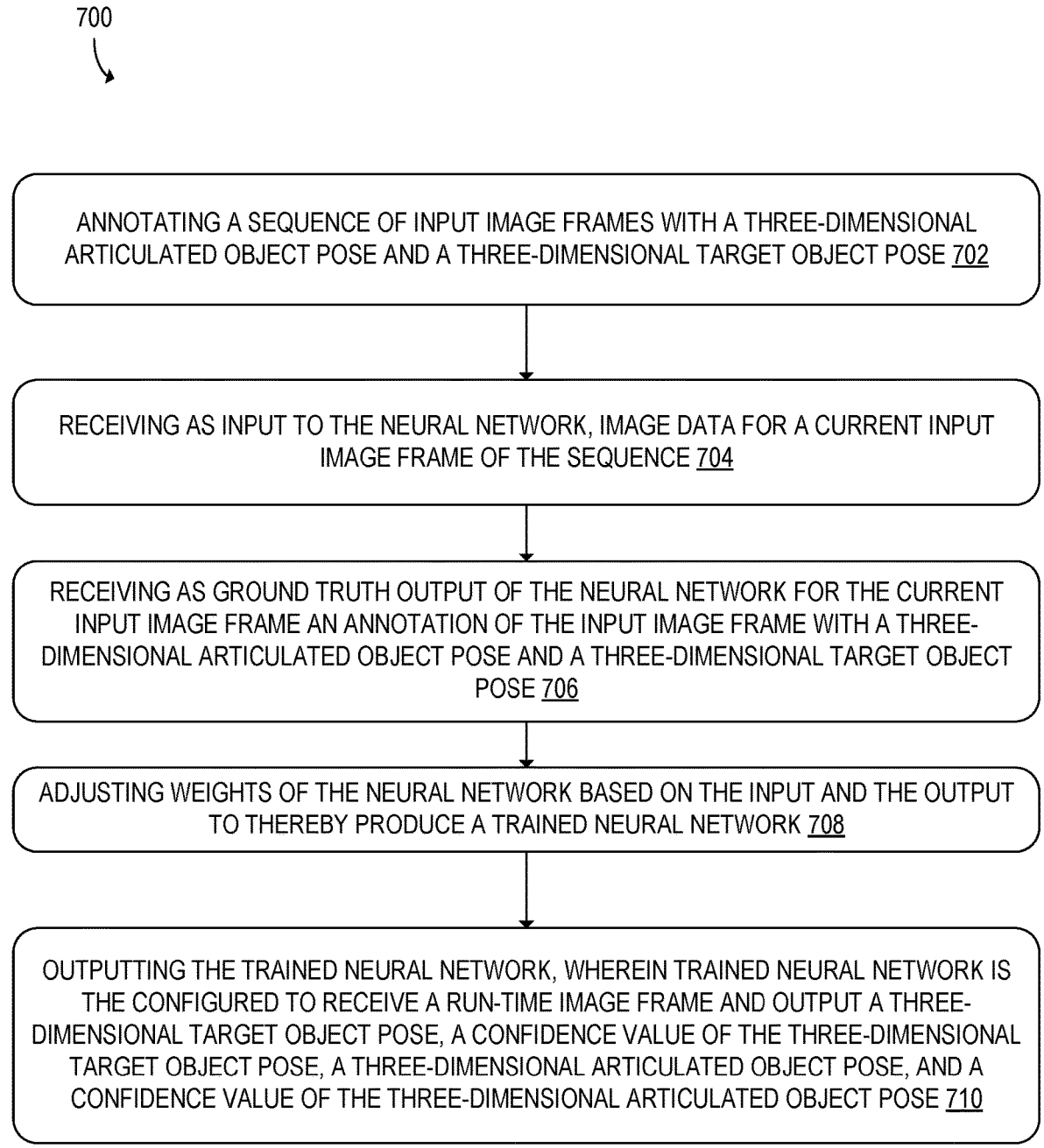
FIG. 7 shows a flowchart of an example method for training the neural network executed by the data processing system of FIG. 1.
Figure 8:
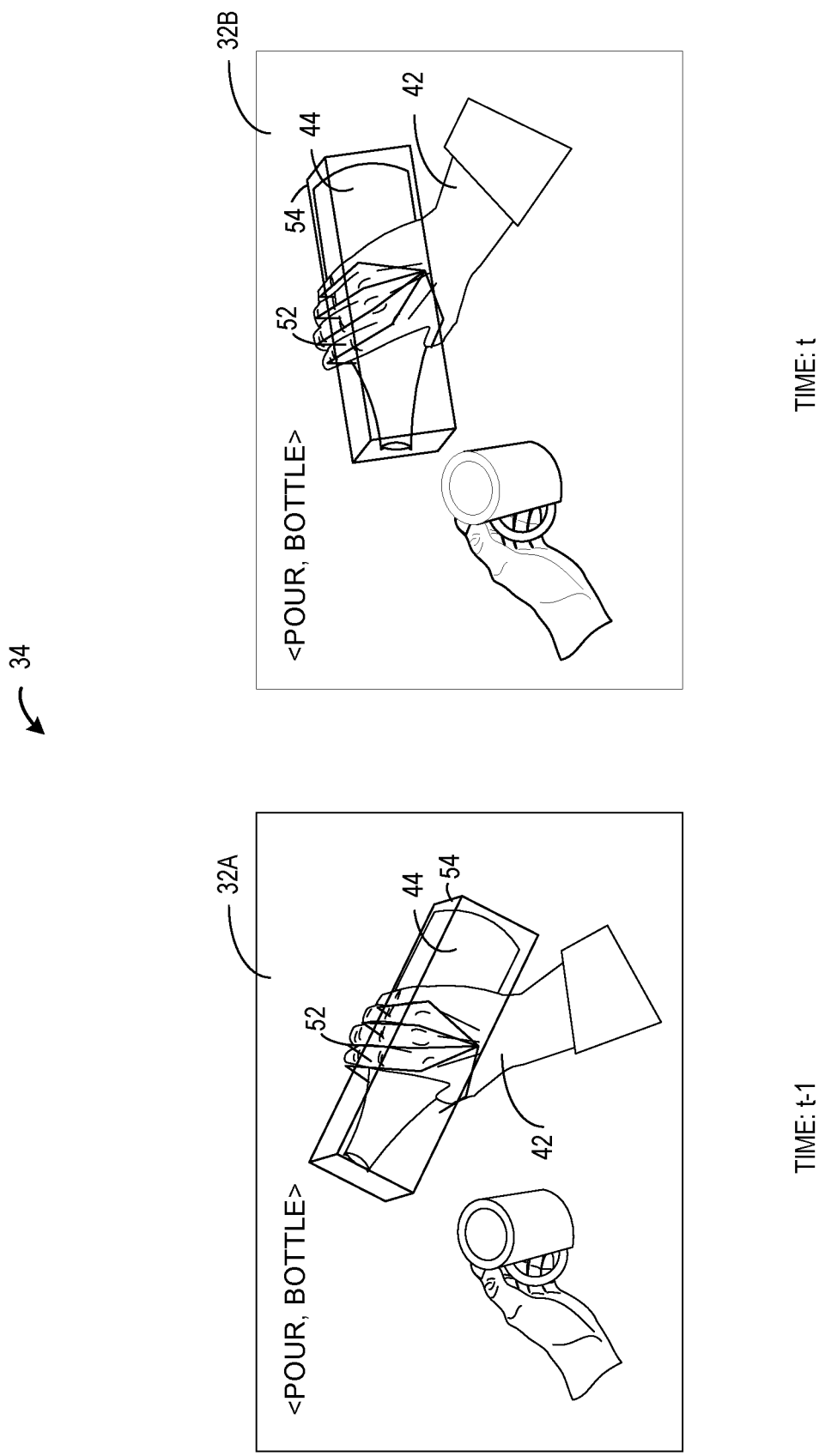
FIG. 8 shows two example illustratively annotated input image frames for training the neural network executed by the data processing system of FIG. 1.

FIG. 7 shows a flowchart for a computer-implemented method 700 for training the neural network 40 described above. The method 700 may be implemented by the data processing system 10. At 702, the method 700 may include annotating a sequence of input image frames with a three-dimensional articulated object pose and a three-dimensional target object pose. The three-dimensional articulated object pose and the three-dimensional target object pose may be represented in three-dimensional space, as described above with reference to FIG. 5. An illustrative example of an annotated sequence 34 of input images 32 is shown in FIG. 8. It should be appreciated that FIG. 8 depicts the annotations as being drawn on top of the input image frames 32 for illustrative purposes, and that the annotations would be inputted to the neural network 40 being trained as an input vector that contains annotated training values for the three-dimensional articulated object pose, the three-dimensional target object pose, the target object class, the action class, and confidence values, etc. In one example, the input vector may be a concatenated vector that includes these annotated values.

As shown in FIG. 8, the three-dimensional target object pose 54 may be represented by a bounding box, and the three-dimensional articulated object pose 52 may be represented by a skeletal representation. As described with reference to FIG. 4, both the three-dimensional articulated object pose 52 and three-dimensional target object pose 54 may be defined by a plurality of control points 58. The annotations may also include an interaction <verb, noun> pair that indicates a candidate target object class and a candidate action class for the input image frame. In the example illustrated in FIG. 8, the candidate target object class is a noun <bottle>, and the candidate action class is a verb <pour>. The candidate interaction class 78 is the concatenated noun, verb pair <pour, bottle>, which may have a computed interaction class probability 80.

As discussed above with reference to FIG. 5, the three-dimensional target object may be represented as a vector containing the plurality of control points that define the bounding box for the three-dimensional target object pose, a candidate target object class, candidate target object class probabilities, and an overall confidence value of the three-dimensional target object pose estimation. Similarly, the three-dimensional articulated object may be represented as a vector containing a plurality of the control points that define a skeletal representation for the three-dimensional articulated object pose, a candidate action class, action class probabilities, and overall confidence value of the three-dimensional articulated object pose estimation. During training, the input image frames 32 may be annotated with input vectors that contain annotated values for each of these aspects. The annotation may be performed programmatically or via human annotation methods.

At 704, the method 700 may include receiving as input to the neural network 40, image data for a current input image frame 32 of the sequence 34. In one example, the image data may include color image data such as RGB image data. In another example, the image data may further include depth data for a scene captured in the current input image frame 32. However, it should be appreciated that other image data modalities may be processed by the data processing system 10, such as, for example, gray scale images, red-green-blue depth (RGBD) images, infrared images, infrared-depth images, and other types of image data. Example input image frames 32 are illustrated with reference to FIG. 3.

At 706, the method 700 may include receiving as ground truth output of the neural network 40 for the current input image frame 32 an annotation of the input image frame 32 with a three-dimensional articulated object pose 52 and a three-dimensional target object pose 54. In one example, the three-dimensional articulated object pose and the three-dimensional target object pose are represented in three-dimensional space in the annotation.

At 708, the method 700 may include adjusting weights of the neural network based on the input and the output to thereby produce a trained neural network 40. A specific process for training the neural network 40 will now be described. With reference to FIG. 5, in one example, for each frame t, a loss function to train the neural network 40 may be defined as follows:

$$\mathcal{L} = \lambda_{pose} \Sigma_{i \in G^t}(\|\hat{y}_i^h - y_i^h\|_2^2 + \|\hat{y}_i^o - y_i^o\|_2^2) = \quad (7)$$

$$\lambda_{conf} \Sigma_{i \in G^t}((\hat{c}_i^h - c_i^h)^2)(\hat{c}_i^o - c_i^o)^2) - \quad (8)$$

$$\lambda_{actcls} \Sigma_{i \in G^t} \hat{p}_i^a \log p_i^a - \quad (9)$$

$$\lambda_{objcls} \Sigma_{i \in G^t} \hat{p}_i^o \log p_i^o \quad (10)$$

Here, the regularization parameters for the pose and classification losses, $\lambda_{pose}$, $\lambda_{actcls}$, and $\lambda_{objcls}$ are set to 1. For cells that contain an articulated object or a target object, $\lambda_{conf}$ is set to 5. For cells that do not contain an articulated object or a target object, $\lambda_{conf}$ is set to 0.1 to increase model stability. The highest confidence predictions of the FCN are fed to the interaction RNN. An additional loss based on cross entropy for recognizing interactions over the entire sequence is also defined. In one example, the single input image frame and temporal models are jointly merged and trained with a softargmax operation. In another example, due to back-propagation potentially requiring activations to be kept in memory, the complete model may be trained in two stages. In this example, the neural network 40 is first trained on single frames to jointly predict three-dimensional articulated object and target object poses, target object classes, and action categories. The weights of the initial model are then fixed, and at a second stage, train the interaction RNN is trained to propagate information in the temporal domain and model interactions. The complete model takes as input a sequence of images and outputs per-frame three-dimensional articulated object-target object pose predictions, target object classes and action labels along with the estimates of interactions for the entire sequence.

At 710, the method 700 may include outputting the trained neural network 40, wherein trained neural network 40 is configured to receive a run-time image frame and output a three-dimensional target object pose 54, a confidence value of the three-dimensional target object pose, a three-dimensional articulated object pose 52, and a confidence value of the three-dimensional articulated object pose. These three-dimensional poses and the associated confidence values are discussed above with reference to FIG. 5.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
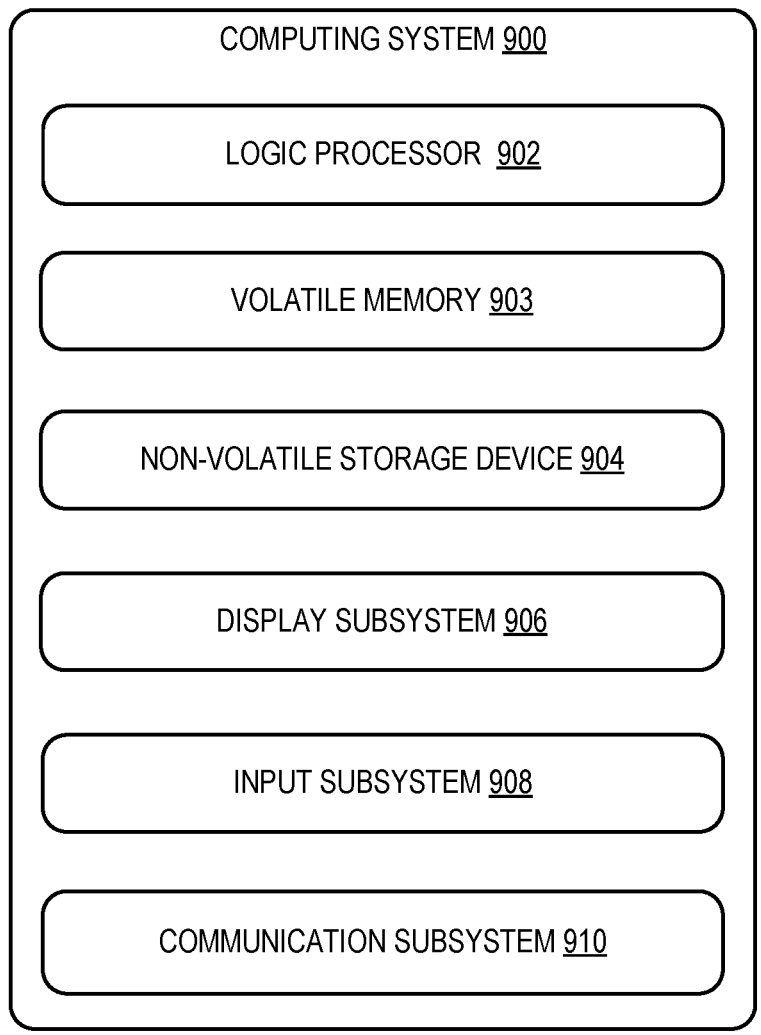
FIG. 9 shows a schematic view of an example computing environment in which the computer device of FIG. 1 may be enacted.

FIG. 9 schematically shows a non-limiting embodiment of a computing system 900 that can enact one or more of the methods and processes described above. Computing system 900 is shown in simplified form. Computing system 900 may embody the data processing system 10 described above and illustrated in FIG. 1. Computing system 900 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a data processing system, comprising a processor having associated memory. The processor is configured to execute instructions using portions of the memory to cause the processor to, at classification time, receive an input image frame from an image source, the input image frame including an articulated object and a target object. The processor is further configured to process the input image frame using a trained neural network configured to, for each input cell of a plurality of input cells in the input image frame predict a three-dimensional articulated object pose of the articulated object and a three-dimensional target object pose of the target object. The processor is further configured to output the three-dimensional articulated object pose and the three-dimensional target object pose from the neural network. In this aspect, additionally or alternatively, the processor may be configured to further process the input image frame by, for each input cell of the plurality of input cells in the input image frame, computing an articulated object presence confidence value and a target object presence confidence value for the input cell. The processor may be further configured to output the articulated object presence confidence value and target object presence confidence value with the three-dimensional articulated object pose and the three-dimensional target object pose. In this aspect, additionally or alternatively, the processor may be configured to compute the articulated object presence confidence value and the target object presence confidence value based upon respective Euclidean distances of the predicted three-dimensional articulated object pose and the predicted three-dimensional target object pose to corresponding ground truths of the articulated object pose and target object pose of the trained neural network. In this aspect, additionally or alternatively, the image source may be selected from the group consisting of an image data store and an image sensor. In this aspect, additionally or alternatively, the image source may be the image sensor, and the image sensor may be configured as a visual light camera being configured to capture visual light and/or a depth camera configured to capture infrared light, and the image sensor may be configured to capture images of a type selected from the group consisting of a grayscale image, a red-green-blue depth (RGBD) image, an infrared image, and an infrared-depth image. In this aspect, additionally or alternatively, the trained neural network may be a single shot feedforward fully convolutional neural network. In this aspect, additionally or alternatively, each input cell may be a pixel or region of pixels. In this aspect, additionally or alternatively, to predict each of the three-dimensional articulated object pose and three-dimensional target object pose the processor may be configured to estimate offsets from a predetermined location in the input cell to each of a plurality of a control points for the three-dimensional articulated object pose and three-dimensional target object pose. In this aspect, additionally or alternatively, the processor may be further configured to, based on estimated three-dimensional locations of the plurality of control points, estimate a six degrees of freedom (6DoF) vector from the estimated offsets by applying a transformation to the estimated offsets. In this aspect, additionally or alternatively, the processor may be further configured to, at classification time, compute one or more candidate target object classes for the target object and a respective target object class probability for each of the one or more candidate target object classes, compute one or more candidate action classes for the articulated object and a respective action class probability for each of the one or more action classes, and output the one or more candidate target object classes and candidate target object class probabilities and the one or more candidate action classes and candidate action class probabilities with the three-dimensional articulated object pose and the three-dimensional target object pose, from the neural network. In this aspect, additionally or alternatively, an interaction recurrent neural network may be utilized to compute one or more candidate interaction classes and interaction class probabilities. In this aspect, additionally or alternatively, to train the interaction RNN, a composite input of three-dimensional articulated object pose and three-dimensional target object pose data may be fed to the interaction RNN to enable the interaction RNN to learn dependencies between the three-dimensional articulated object pose and three-dimensional target object pose. In this aspect, additionally or alternatively, the processor may be further configured to output the three-dimensional articulated object pose, the three-dimensional target object pose, the one or more candidate target object classes and the target object class probabilities, and the one or more candidate action classes and action class probabilities in a composite data structure to a program for downstream processing.

Another aspect provides a method comprising, at a processor during a classification time, receiving an input image frame from an image source, the input image frame including an articulated object and a target object. The method further comprises processing the input image frame using a trained neural network configured to, for each input cell of a plurality of input cells in the input image frame predicting a three-dimensional articulated object pose of the articulated object and a three-dimensional target object pose of the target object relative to the input cell. The method further comprises outputting the three-dimensional articulated object pose and the three-dimensional target object pose from the neural network. In this aspect, additionally or alternatively, the method may further comprise processing the input image frame by, for each input cell of the plurality of input cells in the input image frame, computing an articulated object presence confidence value and a target object presence confidence value for the input cell, and outputting the articulated object presence confidence value and target object presence confidence value with the three-dimensional articulated object pose and the three-dimensional target object pose. In this aspect, additionally or alternatively, predicting each of the three-dimensional articulated object pose and three-dimensional target object pose may further comprise estimating offsets from a predetermined location in the input cell to each of a plurality of a control points for the three-dimensional articulated object pose and three-dimensional target object pose. In this aspect, additionally or alternatively, the method may further comprise, based on estimated locations of the plurality of control points, estimating a six degrees of freedom (6DoF) vector from the estimated offsets by applying a transformation to the estimated offsets. In this aspect, additionally or alternatively, the method may further comprise computing one or more candidate target object classes for the target object and a respective target object class probability for each of the one or more candidate target object classes, computing one or more candidate action classes for the articulated object and a respective action class probability for each of the one or more action classes, and outputting the one or more candidate target object classes and candidate target object class probabilities and the one or more candidate action classes and candidate action class probabilities with the three-dimensional articulated object pose and the three-dimensional target object pose, from the neural network. In this aspect, additionally or alternatively, an interaction recurrent neural network may be utilized for computing one or more candidate interaction classes and interaction class probabilities.

Another aspect provides a data processing system comprising a processor having associated memory. The processor is configured to execute instructions using portions of the memory to cause the processor to, at training time, train a neural network by, for each of a sequence of multiple input image frames containing an articulated object and a target object, receiving as input to the neural network, image data for a current input image frame of the sequence, receiving as ground truth output of the neural network for the current input image frame an annotation of the input image frame with a three-dimensional articulated object pose and a three-dimensional target object pose, wherein the three-dimensional articulated object pose and the three-dimensional target object pose are represented in three-dimensional space in the annotation, and adjusting weights of the neural network based on the input and the output to thereby produce a trained neural network. The processor is further configured for outputting the trained neural network, wherein trained neural network is the configured to receive a run-time image frame and output a three-dimensional target object pose, a confidence value of the three-dimensional target object pose, a three-dimensional articulated object pose, and a confidence value of the three-dimensional articulated object pose.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A data processing system, comprising:
a processor having associated memory, the processor being configured to execute instructions using portions of the memory to cause the processor to:
at classification time:
receive an input image frame from an image source, the input image frame including an articulated object and a target object;
process the input image frame using a trained neural network configured to:
for each input cell of a plurality of input cells in the input image frame predict a three-dimensional articulated object pose of the articulated object and a three-dimensional target object pose of the target object;
for each input cell of the plurality of input cells in the input image frame, compute an articulated object presence confidence value and a target object presence confidence value for the input cell, wherein the articulated object presence confidence value and the target object presence confidence value are computed based upon respective Euclidean distances of the predicted three-dimensional articulated object pose and the predicted three-dimensional target object pose to corresponding ground truths of the articulated object pose and target object pose of the trained neural network; and
output the three-dimensional articulated object pose, the three-dimensional target object pose, the articulated object presence confidence value, and the target object presence confidence value from the neural network.

2. The data processing system of claim 1, wherein the image source is selected from the group consisting of an image data store and an image sensor.

3. The data processing system of claim 2, wherein the image source is the image sensor, and the image sensor is configured as a visual light camera being configured to capture visual light and/or a depth camera configured to capture infrared light, and wherein the image sensor is configured to capture images of a type selected from the group consisting of a grayscale image, a red-green-blue depth (RGBD) image, an infrared image, and an infrared-depth image.

4. The data processing system of claim 1, wherein the trained neural network is a single shot feedforward fully convolutional neural network.

5. The data processing system of claim 1, wherein each input cell is a pixel or region of pixels.

6. The data processing system of claim 5, wherein to predict each of the three-dimensional articulated object pose and three-dimensional target object pose the processor is configured to estimate offsets from a predetermined location in the input cell to each of a plurality of a control points for the three-dimensional articulated object pose and three-dimensional target object pose.

7. The data processing system of claim 6, wherein the processor is further configured to, based on estimated three-dimensional locations of the plurality of control points, estimate a six degrees of freedom (6DoF) vector from the estimated offsets by applying a transformation to the estimated offsets.

8. The data processing system of claim 1, wherein the processor is further configured to, at classification time:
compute one or more candidate target object classes for the target object and a respective target object class probability for each of the one or more candidate target object classes; and
compute one or more candidate action classes for the articulated object and a respective action class probability for each of the one or more action classes; and
output the one or more candidate target object classes and candidate target object class probabilities and the one or more candidate action classes and candidate action class probabilities with the three-dimensional articulated object pose and the three-dimensional target object pose, from the neural network.

9. The data processing system of claim 8, wherein an interaction recurrent neural network is utilized to compute one or more candidate interaction classes and interaction class probabilities.

10. The data processing system of claim 9, wherein, to train the interaction RNN, a composite input of three-dimensional articulated object pose and three-dimensional target object pose data is fed to the interaction RNN to enable the interaction RNN to learn dependencies between the three-dimensional articulated object pose and three-dimensional target object pose.

11. The data processing system of claim 10, wherein the processor is further configured to output the three-dimensional articulated object pose, the three-dimensional target object pose, the one or more candidate target object classes and the target object class probabilities, and the one or more candidate action classes and action class probabilities in a composite data structure to a program for downstream processing.

12. A data processing system, comprising:
a processor having associated memory, the processor being configured to execute instructions using portions of the memory to cause the processor to:
at classification time:
receive an input image frame from an image source, the input image frame including an articulated object and a target object;
process the input image frame using a trained neural network configured to:
for each input cell of a plurality of input cells in the input image frame predict a three-dimensional articulated object pose of the articulated object and a three-dimensional target object pose of the target object, wherein each input cell is a pixel or region of pixels, wherein to predict each of the three-dimensional articulated object pose and three-dimensional target object pose the processor is configured to estimate offsets from a predetermined location in the input cell to each of a plurality of a control points for the three-dimensional articulated object pose and three-dimensional target object pose, and wherein the processor is further configured to, based on estimated three-dimensional locations of the plurality of control points, estimate a six degrees of freedom (6DoF) vector from the estimated offsets by applying a transformation to the estimated offsets; and output the three-dimensional articulated object pose and the three-dimensional target object pose from the neural network.

13. The data processing system of claim 12, wherein the processor is configured to further process the input image frame by, for each input cell of the plurality of input cells in the input image frame, computing an articulated object presence confidence value and a target object presence confidence value for the input cell; and output the articulated object presence confidence value and target object presence confidence value with the three-dimensional articulated object pose and the three-dimensional target object pose.

14. The data processing system of claim 13, wherein the processor is configured to compute the articulated object presence confidence value and the target object presence confidence value based upon respective Euclidean distances of the predicted three-dimensional articulated object pose and the predicted three-dimensional target object pose to corresponding ground truths of the articulated object pose and target object pose of the trained neural network.

15. The data processing system of claim 12, wherein the processor is further configured to, at classification time:

compute one or more candidate target object classes for the target object and a respective target object class probability for each of the one or more candidate target object classes; and compute one or more candidate action classes for the articulated object and a respective action class probability for each of the one or more action classes; and output the one or more candidate target object classes and candidate target object class probabilities and the one or more candidate action classes and candidate action class probabilities with the three-dimensional articulated object pose and the three-dimensional target object pose, from the neural network.

16. A method comprising:

at a processor during a classification time:

receiving an input image frame from an image source, the input image frame including an articulated object and a target object;

processing the input image frame using a trained neural network configured to, for each input cell of a plurality of input cells in the input image frame predicting a three-dimensional articulated object pose of the articulated object and a three-dimensional target object pose of the target object relative to the input cell;

computing one or more candidate target object classes for the target object and a respective target object class probability for each of the one or more candidate target object classes;

computing one or more candidate action classes for the articulated object and a respective action class probability for each of the one or more action classes; and outputting the three-dimensional articulated object pose, the three-dimensional target object pose, the one or more candidate target object classes and candidate target object class probabilities, and the one or more candidate action classes and candidate action classes probabilities from the neural network.

17. The method of claim 16, further comprising processing the input image frame by, for each input cell of the plurality of input cells in the input image frame, computing an articulated object presence confidence value and a target object presence confidence value for the input cell; and outputting the articulated object presence confidence value and target object presence confidence value with the three-dimensional articulated object pose and the three-dimensional target object pose.

18. The method of claim 16, wherein predicting each of the three-dimensional articulated object pose and three-dimensional target object pose further comprises estimating offsets from a predetermined location in the input cell to each of a plurality of a control points for the three-dimensional articulated object pose and three-dimensional target object pose.

19. The method of claim 18, further comprising, based on estimated locations of the plurality of control points, estimating a six degrees of freedom (6DoF) vector from the estimated offsets by applying a transformation to the estimated offsets.

20. The method of claim 16, wherein an interaction recurrent neural network is utilized for computing one or more candidate interaction classes and interaction class probabilities.

* * * * *